(12) United States Patent
Heck et al.

(10) Patent No.: US 10,940,523 B2
(45) Date of Patent: Mar. 9, 2021

(54) APPARATUS FOR MANUFACTURING PARTS, AND RELATED METHODS

(71) Applicant: The Boeing Company, Chicago, IL (US)

(72) Inventors: David P. Heck, Saint Charles, MO (US); Kevin Thomas Slattery, Saint Peters, MO (US); David M. Milliken, Sheffield (GB)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 15/996,343

(22) Filed: Jun. 1, 2018

(65) Prior Publication Data
US 2019/0366419 A1    Dec. 5, 2019

(51) Int. Cl.
*B21J 5/02*     (2006.01)
*B21J 13/02*    (2006.01)
*B23P 15/24*    (2006.01)

(52) U.S. Cl.
CPC .............. *B21J 5/025* (2013.01); *B21J 13/02* (2013.01); *B23P 15/246* (2013.01)

(58) Field of Classification Search
CPC ....... B23P 15/246; B21D 37/02; B21D 37/20; B21J 13/02
See application file for complete search history.

(56) References Cited

U.S. PATENT DOCUMENTS

| 2,547,168 | A | * | 4/1951 | Nill | .................. | B21D 28/14 |
|           |   |   |        |      |                    | 83/146 |
| 2,679,172 | A | * | 5/1954 | Clevenger | ........... | B21D 37/20 |
|           |   |   |        |           |             | 76/107.1 |

(Continued)

FOREIGN PATENT DOCUMENTS

| CN | 102688969 | 9/2012 |
| CN | 107088636 | 8/2017 |

(Continued)

OTHER PUBLICATIONS

European Patent Office, Extended European Search Report for related European Patent Application No. 19176234, dated Nov. 15, 2019.

(Continued)

*Primary Examiner* — Jason L Vaughan
(74) *Attorney, Agent, or Firm* — Dascenzo Gates Intellectual Property Law, P.C.

(57) ABSTRACT

Forging dies are formed from a plurality of layers stacked together to form an assembly, or laminate. Each respective layer may be cut to form a portion of a die cavity, and the layers may be stacked together such that the cut portions are aligned to form the die cavity. The layers are fastened together to form a first die half and/or a second die half of disclosed forging dies. Each layer may be selectively removable from the die half for maintenance and/or replacement. Disclosed forging dies may be formed of lower grade materials as compared to conventional forging dies, and the number and thickness of layers may be varied to accommodate the specific part geometry of the part being forged. Related methods of making said forging dies and using said forging dies to make parts are also disclosed.

20 Claims, 11 Drawing Sheets

(56) References Cited

U.S. PATENT DOCUMENTS

| | | | | |
|---|---|---|---|---|
| 3,375,568 A * | 4/1968 | Kelsey | ............. | B23Q 35/42 |
| | | | | 29/407.1 |
| 3,779,111 A * | 12/1973 | Bailey | ............. | G06K 1/02 |
| | | | | 83/23 |
| 4,457,354 A | 7/1984 | Dantzig et al. | | |
| 5,031,483 A * | 7/1991 | Weaver | ............. | B29C 33/3828 |
| | | | | 76/107.1 |
| 5,071,503 A * | 12/1991 | Berman | ............. | G03F 7/70416 |
| | | | | 156/250 |
| 5,793,015 A * | 8/1998 | Walczyk | ............. | B29C 64/141 |
| | | | | 219/121.67 |
| 6,145,418 A * | 11/2000 | Bares | ............. | B25B 7/00 |
| | | | | 81/421 |
| 6,587,742 B2 * | 7/2003 | Manuel | ............. | B29C 33/3842 |
| | | | | 700/98 |
| 6,627,835 B1 * | 9/2003 | Chung | ............. | B23H 7/02 |
| | | | | 219/69.12 |
| 6,779,708 B2 | 8/2004 | Slattery | | |
| 7,021,523 B2 * | 4/2006 | Manuel | ............. | B23P 15/246 |
| | | | | 228/245 |
| 7,174,619 B2 * | 2/2007 | Smeenk | ............. | B23P 15/246 |
| | | | | 264/1.9 |
| 7,712,396 B2 * | 5/2010 | Holmquist | ............. | B21D 37/205 |
| | | | | 76/107.1 |
| 7,841,504 B2 | 11/2010 | Slattery et al. | | |
| 7,891,535 B2 | 2/2011 | Slattery et al. | | |
| 7,920,937 B2 * | 4/2011 | Barlier | ............. | B29C 33/04 |
| | | | | 700/119 |
| 8,079,509 B2 * | 12/2011 | Lowney | ............. | B23K 3/087 |
| | | | | 228/262.51 |
| 8,177,113 B2 | 5/2012 | Slattery | | |
| 8,302,450 B2 | 11/2012 | Slattery et al. | | |
| 8,316,687 B2 | 11/2012 | Slattery | | |
| 8,540,913 B2 * | 9/2013 | Appleby | ............. | B29C 33/302 |
| | | | | 264/219 |
| 8,601,850 B2 | 12/2013 | Slattery et al. | | |
| 8,844,796 B1 | 9/2014 | Slattery | | |
| 8,899,093 B2 * | 12/2014 | Beltran de Nanclares Echezarreta | ............. | B21D 1/00 |
| | | | | 72/455 |
| 9,032,774 B1 * | 5/2015 | Hanks | ............. | B23P 15/246 |
| | | | | 72/413 |
| 9,315,663 B2 * | 4/2016 | Appleby | ............. | B22C 9/04 |
| 9,597,725 B2 * | 3/2017 | Sasaki | ............. | B23P 15/24 |
| 2004/0247725 A1 * | 12/2004 | Lang | ............. | B23P 15/246 |
| | | | | 425/183 |
| 2008/0050463 A1 * | 2/2008 | Lin | ............. | B29C 33/04 |
| | | | | 425/338 |
| 2009/0142549 A1 * | 6/2009 | Manuel | ............. | B29C 33/38 |
| | | | | 428/137 |
| 2011/0036139 A1 | 2/2011 | Slattery | | |
| 2011/0036141 A1 | 2/2011 | Slattery et al. | | |
| 2011/0042445 A1 | 2/2011 | Slattery et al. | | |
| 2013/0019649 A1 | 1/2013 | Slattery et al. | | |
| 2013/0200546 A1 * | 8/2013 | Lowney | ............. | B21D 37/20 |
| | | | | 264/219 |
| 2014/0255718 A1 | 9/2014 | Slattery | | |

FOREIGN PATENT DOCUMENTS

| | | |
|---|---|---|
| CN | 206824590 | 1/2018 |
| JP | S6356409 | 3/1988 |
| JP | 2003103324 | 4/2003 |
| JP | 2014208379 | 11/2014 |

OTHER PUBLICATIONS

Machine-generated English translation of JP S6356409, provided with Nov. 15, 2019 Extended European Search Report.

Machine-generated English translation of JP 2003103324, provided with Nov. 15, 2019 Extended European Search Report.

Machine-generated English translation of CN 102688969, provided with Nov. 15, 2019 Extended European Search Report.

Machine-generated English translation of JP 2014208379, provided with Nov. 15, 2019 Extended European Search Report.

Machine-generated English translation of the abstract of CN 107088636, downloaded from Espacenet on Feb. 6, 2020.

Machine-generated English translation of CN 206824590, provided with Nov. 15, 2019 Extended European Search Report.

* cited by examiner

APPARATUS FOR MANUFACTURING PARTS, AND RELATED METHODS

FIELD

The present disclosure relates to apparatus for manufacturing parts and related methods, namely, forging dies for forging parts, methods of making said forging dies, and methods of making a part using said forging dies.

BACKGROUND

Parts may be manufactured by a forging process, wherein metal is shaped in a forging die using localized compressive forces and/or heating of the die and/or metal. Forging dies are typically made by removing material from a solid block of an expensive grade of steel (often referred to as tool steel) to form a cavity therein. The process of making forging dies is often slow and time consuming, as the tool steel is difficult to cut and remove to form the cavity. The tools used to cut cavities in forging dies may suffer from low cutting tool life, due to the properties of the tool steel being cut. In addition, the materials for making forging dies generally are expensive and difficult to source. Furthermore, storage and maintenance costs for forging dies are often high, as forging dies may require storage and/or refurbishment between uses, such as re-cutting, dressing, and/or after-forging operations. Some parts may require multiple different forging dies to arrive at the finished part, even further increasing costs. Thus, while forged parts often have desirable mechanical properties, the process of obtaining such parts may be costly, time-consuming, and undesirable.

SUMMARY

Presently disclosed forging dies may reduce the time and/or costs associated with manufacturing a forging die. Presently disclosed forging dies advantageously may avoid storage costs, as they may be configured to be essentially disposable, due to their speed and cost-efficiency. Such forging dies may additionally avoid refurbishment needs, in some examples. Presently disclosed forging dies may additionally ease maintenance costs and difficulty associated with repairing worn or damaged forging dies, and/or may reduce machining time and costs associated with making forging dies. Generally, presently disclosed forging dies are made by cutting individual layers of material to form sections of the die cavity and then stacking the cut layers together to form the die cavities, as opposed to cutting the die cavities into a solid block of material.

Such presently disclosed forging dies generally include a first die half and a second die half, with the second die half and the first die half being configured to cooperate with one another such that a first die cavity formed in the first die half faces the second die half. The first die cavity is configured to receive at least a portion of a preform (e.g., a billet, a bar, a blank, or any other preform), and the forging die is configured to forge the part from the preform when the first die half and the second die half are pressed together. The first die half includes at least a first layer cut to form a first portion of a first die cavity and a second layer cut to form a second portion of the first die cavity, and may include additional layers cut to form additional layers of the first die cavity, stacked between the first and second layers. The first layer and the second layer (and any additional layers of the first die half) are configured to be stacked together such that the first portion of the first die cavity and the second portion of the first die cavity are aligned with respect to one another to form the first die cavity. A first plurality of fasteners are positioned to fasten the first layer and the second layer (and any additional layers of the first die half) together to form the first die half. In some examples, the second die half is a solid die half having a flat surface that engages the first die half. In other examples, the second die half also is formed of a plurality of layers, where each layer is cut to form a section, or portion, of a second die cavity in the second die half. In such cases, a second plurality of fasteners is positioned to fasten the layers of the second die half together. The first die half and the second die half may be pressed together (such as in a forging press) to shape a billet, blank, bar, or other preform, into a forged part.

Methods of making a forging die for forging a part from a preform generally include forming a first die half and engaging the first die half with a second die half such that the first die cavity faces the second die half. The first die cavity is configured to receive at least a portion of the preform, and the forging die is configured to forge the part from the preform when the first die half and the second die half are pressed together. Forming the first die half generally includes cutting a first layer to form a first portion of a first die cavity, cutting a second layer to form a second portion of the first die cavity, stacking the first layer and the second layer together such that the first portion of the first die cavity and the second portion of the first die cavity are positioned with respect to one another to form the first die cavity, and fastening the first layer and the second layer together to form the first die half. Methods also may include similarly forming a second die cavity in the second die half, though in some examples, the second die half may be a flat surface or solid block of material. Methods of making parts using such disclosed forging dies also are disclosed.

DESCRIPTION

Figure 1:
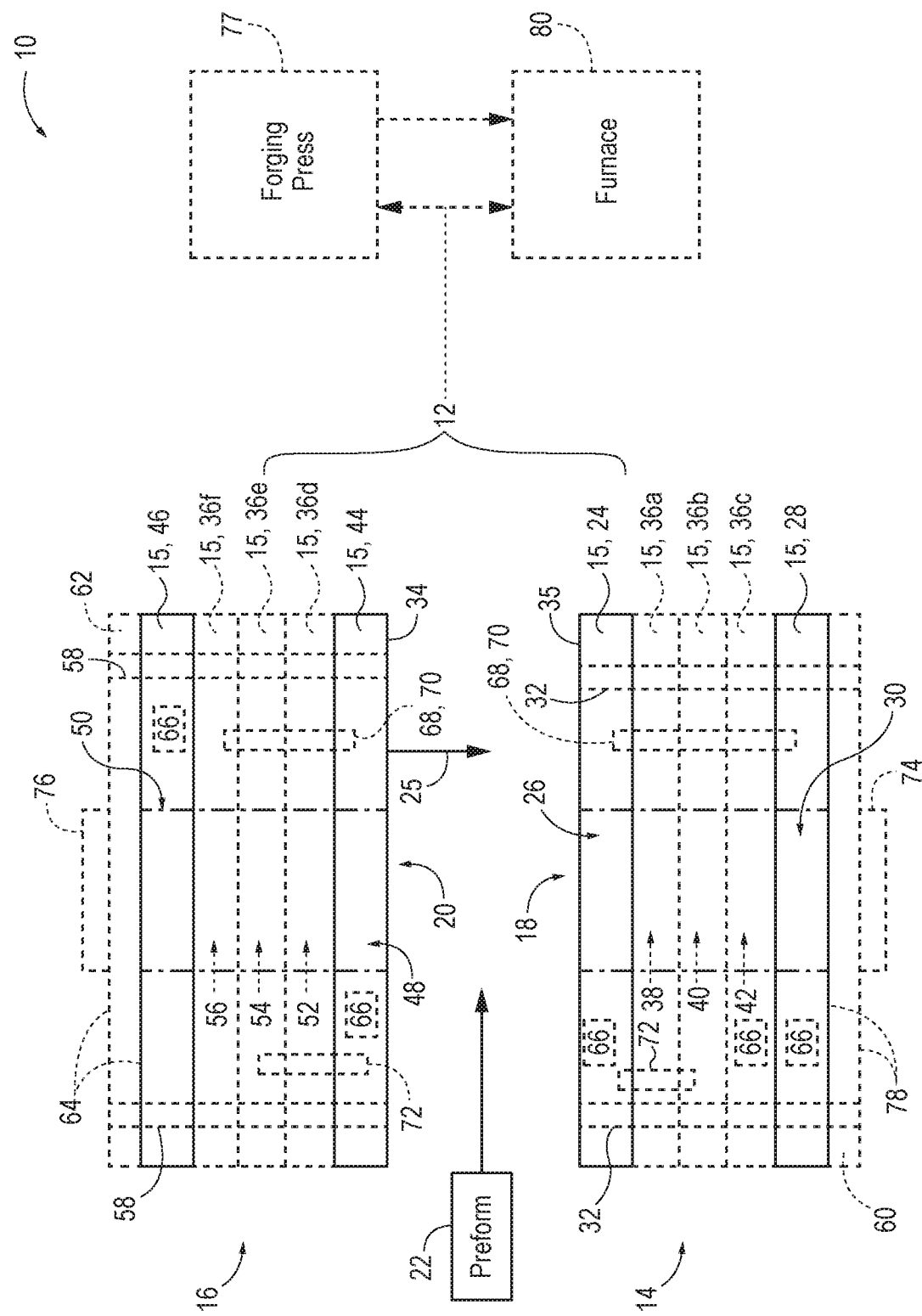
FIG. 1 is a schematic black-box representation of examples of systems including forging dies according to the present disclosure.

Contrary to conventional forging dies, which are milled from solid blocks of material, presently disclosed forging dies may be assembled from individual layers of material, which may save on time and costs as compared to conventional forging dies, as will be detailed below. FIG. 1 schematically illustrates examples of system 10, which generally includes a forging die 12 formed of a first die half 14 and a second die half 16. First die half 14 and/or second die half 16 may include a die cavity (e.g., a first die cavity 18 formed in first die half 14 and/or a second die cavity 20 formed in second die half 16) configured to receive at least a portion of a preform 22. When so configured, first die half 14 and second die half 16 may be pressed together, thereby forcing preform 22 to be shaped into the desired part in the forging process. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

First die half 14 is formed from a plurality of individual layers 15 assembled together to form first die half 14. For example, first die half 14 includes at least a first layer 24 cut to form a first portion 26 of first die cavity 18, and a second layer 28 cut to form a second portion 30 of first die cavity 18. Respective layers 15 may each be cut differently, such that when the layers are stacked together, the cut portions (e.g., first portion 26 and second portion 30 of first die cavity 18) together form first die cavity 18. In other words, first layer 24 and second layer 28 are configured to be stacked together such that first portion 26 of first die cavity 18 and second portion 30 of first die cavity 18 are aligned and positioned with respect to one another to form first die cavity 18. A first plurality of fasteners 32 may be configured to fasten the respective layers 15 of first die half 14 together. For example, first plurality of fasteners 32 secure first layer 24, second layer 28, and any intervening layers 36 (e.g., layers 36a, 36b, and 36c, each of which are examples of layers 15) together to form first die half 14. Each respective fastener of first plurality of fasteners 32 may extend through some or all of one or more layers 15 of first die half 14, but together function to assemble layers 15 with respect to one another and to resist or prevent movement of respective layers 15 with respect to one another, such that the respective layers 15 are positioned with respect to one another to maintain the desired alignment of cut portions, thereby forming first die cavity 18. Additionally or alternatively, respective layers of first die half 14 may be secured together by other suitable means, such as by using adhesives. In some examples, a filler material may be included between layers, such as in cases where the surfaces of the layers are not flat or smooth. The layers of first die half 14 and second die half 16 generally are not welded or brazed together, but welding (e.g., edge or plug welding) or brazing may be used in some examples. For example, one or more layers 15 or portions of layers may be welded together to reduce stress in a given layer 15, and/or to prevent local separation of adjacent respective layers 15 due to localized prying forces. First die cavity 18 is generally shaped in accordance with the desired size, shape, and contours of the desired finished part to be forged in forging die 12, and is configured to receive at least a portion of preform 22.

First die half 14 and second die half 16 are configured to engage and/or cooperate with one another such that first die cavity 18 faces second die half 16 when first die half 14 and second die half 16 are pressed together to forge the part. Some examples of forging die 12 may include one or more alignment pins or other alignment structures configured to ensure proper alignment of first die half 14 with second die half 16. In some examples, first die half 14 is configured to receive substantially the entire preform 22 within first die cavity 18, such that during forging, second die half 16 presses preform 22 into first die cavity 18, thereby shaping preform 22. In these cases, second die half 16 may be substantially solid, and/or may have a second engagement surface 34, which may be substantially flat or raised, for engaging first die half 14 when the two die halves 14, 16 are pressed together to forge the part. In other examples, second die half 16 includes second die cavity 20, which may be configured to receive a portion of preform 22, with the die halves 14, 16 being arranged with respect to one another such that first die cavity 18 faces and is aligned with second die cavity 20, with respective portions of preform 22 being positioned within first die cavity 18 and second die cavity 20 during forging. In such an arrangement, second engagement surface 34 of second die half 16 may face a first engagement surface 35 of first die half 14, may be positioned adjacent first engagement surface 35, and/or may be brought into contact with first engagement surface 35. In some examples, first engagement surface 35 is an upper surface of first layer 24 of first die half 14, and second engagement surface 34 is a lower surface of third layer 44 of second die half 16. In some examples, a portion of first engagement surface 35 may be raised with respect to other areas of first engagement surface 35, such as in an area surrounding first die cavity 18. Additionally or alternatively, a portion of second engagement surface 34 may be raised with respect to other areas of second engagement surface 34, such as in an area surrounding second die cavity 20.

First die half 14 may include any suitable number of layers 15. For clarity of description herein, first layer 24 is identified as the respective layer 15 forming the "upper" (as illustrated, but not limiting in terms of orientation of the die half) layer of first die half 14, and second layer 28 is identified as the respective layer 15 forming the "lower" (as illustrated) layer of first die half 14. Such conventions will be consistent throughout the present disclosure, and generally refer to the orientations of the respective die halves when they are arranged for engagement with one another.

First layer 24 is opposite second layer 28, and first die half 14 may optionally include one or more additional, or intervening, layers 36 (which are examples of layers 15) positioned between first layer 24 and second layer 28. For example, FIG. 1 illustrates three such intervening layers 36 in broken lines: layer 36a, layer 36b, and layer 36c. Other examples of first die half 14 may include more or fewer intervening layers 36 positioned between first layer 24 and second layer 28. In some examples, first die half 14 includes just first layer 24 and second layer 28 without any intervening layers 36 positioned therebetween. In some examples, first die half 14 includes a single intervening layer 36 (e.g., layer 36a) positioned between first layer 24 and second layer 28. In other examples, first die half 14 includes at least two intervening layers 36, at least three intervening layers 36, at least four intervening layers 36, at least five intervening layers 36, at least six intervening layers 36, at least seven intervening layers 36, at least eight intervening layers 36, at least nine intervening layers 36, at least ten intervening layers 36, at least 12 intervening layers 36, at least 15 intervening layers 36, at least 20 intervening layers 36, and/or at least 25 intervening layers 36. In yet other examples, more intervening layers 36 may be included. First die half 14 of forging die 12 may be selectively customizable, such that the number of layers 15, the thickness of different respective layers 15, and/or the materials used to form different respective layers 15 (or different first die halves 14) may be variable depending on, for example, the geometry, contours, or other properties of the part to be forged. In some examples, the number and thickness of respective layers of first die half 14 may be varied according to the part geometry to minimize the presence of thin plate sections and/or small radii in the respective cut portions of the respective layers.

Each intervening layer 36 may be cut to form an additional respective portion of first die cavity 18 and may be configured to be stacked between first layer 24 and second layer 28 such that the additional respective portions of first die cavity 18 are positioned with respect to first portion 26 and second portion 30 to form first die cavity 18. For example, intervening layer 36a may be cut to form a third portion 38 of first die cavity 18, intervening layer 36b may be cut to form a fourth portion 40 of first die cavity 18, and intervening layer 36c may be cut to form a fifth portion 42 of first die cavity 18, and so on.

In some examples, both first die half 14 and second die half 16 are assembled from a plurality of respective layers 15. For example, second die half 16 may include a third layer 44 and a fourth layer 46 opposite third layer 44, with third layer 44 cut to form a first portion 48 of second die cavity 20, and fourth layer 46 cut to form a second portion 50 of second die cavity 20. Third layer 44 and fourth layer 46 are configured to be stacked together such that first portion 48 of second die cavity 20 and second portion 50 of second die cavity 20 are positioned with respect to one another to form second die cavity 20. Similar to first die half 14, second die half 16 may include just third layer 44 and fourth layer 46, or may include one or more additional, intervening layers 36 positioned between third layer 44 and fourth layer 46, with each respective intervening layer 36 forming a portion of second die cavity 20.

FIG. 1 illustrates intervening layer 36d, intervening layer 36e, and intervening layer 36f, though other examples of second die half 16 may include more or fewer intervening layers 36 positioned between third layer 44 and fourth layer 46. In some examples, second die half 16 includes a single intervening layer 36 (e.g., layer 36d) positioned between third layer 44 and fourth layer 46. In other examples, second die half 16 includes at least two intervening layers 36, at least three intervening layers 36, at least four intervening layers 36, at least five intervening layers 36, at least six intervening layers 36, at least seven intervening layers 36, at least eight intervening layers 36, at least nine intervening layers 36, at least ten intervening layers 36, at least 12 intervening layers 36, at least 15 intervening layers 36, at least 20 intervening layers 36, and/or at least 25 intervening layers 36. In yet other examples, more intervening layers 36 may be included. Second die half 16 of forging die 12 may be selectively customizable, such that the number of layers 15, the thickness of different respective layers 15, and/or the materials used to form different respective layers 15 (or different respective second die halves 16) may be variable depending on, for example, the geometry, contours, or other properties of the part to be forged. As with first die half 14, the number and thickness of respective layers of second die half 16 may be varied according to the part geometry to minimize the presence of thin plate sections and/or small radii in the respective cut portions of the respective layers. In some examples, the number of layers 15 in first die half 14 and/or second die half 16 may be optimized for ease of manufacture of the respective die half and/or for cost efficiency. In some examples, first die half 14 and/or second die half 16 may include layers 15 of alternating thicknesses, such as to account for varying geometry or stress in a given layer 15.

Each intervening layer 36 of second die half 16 may be cut to form a portion of second die cavity 20. For example, intervening layer 36d is cut to form a third portion 52 of second die cavity 20, intervening layer 36e is cut to form a fourth portion 54 of second die cavity 20, and intervening layer 36f is cut to form a fifth portion 56 of second die cavity 20. In examples where second die half 16 includes second die cavity 20, second die half 16 and first die half 14 are configured to cooperate with one another such that first die cavity 18 faces second die cavity 20 and such that first die cavity 18 and second die cavity 20 are each configured to receive a respective portion of preform 22. In this manner, forging die 12 is configured to forge a part from preform 22 when first die half 14 and second die half 16 are pressed together.

A second plurality of fasteners 58 may be configured to fasten the respective layers of second die half 16 together. For example, second plurality of fasteners 58 secures third layer 44, fourth layer 46, and any intervening layers 36 (e.g., layers 36d, 36e, and 36f, each of which are examples of layers 15) together to form second die half 16. Each respective fastener of second plurality of fasteners 58 may extend through some or all of one or more layers 15 of second die half 16, but together function to assemble and align layers 15 with respect to one another and to resist or prevent movement of respective layers 15 with respect to one another, such that the respective layers 15 are positioned with respect to one another to maintain the desired alignment of cut portions, thereby forming second die cavity 20. Additionally or alternatively, respective layers of second die half 16 may be secured together by other suitable means, such as by using adhesives. Second die cavity 20 is generally shaped in accordance with the desired size, shape, and contours of the desired finished part to be forged in forging die 12, and is configured to receive at least a portion of preform 22.

In some systems 10, first die half 14 may include a first baseplate 60, and/or second die half 16 may include a second baseplate 62. First baseplate 60, when included, may be secured to second layer 28, and second baseplate 62, when included, may be secured to fourth layer 46 (or to an upper surface 64 opposite second engagement surface 34, in examples where second die half 16 is not formed of multiple layers 15). Thus, when first die half 14 and second die half 16 are arranged with respect to one another to forge a part (e.g., with first die cavity 18 facing second die half 16), first baseplate 60 and second baseplate 62 may be positioned opposite one another, with the respective layers 15 of first die half 14 and the respective layers 15 of second die half 16 positioned between the two baseplates 60, 62. First baseplate 60 may be thicker than any layer 15 of first die half 14. Similarly, second baseplate 62 may be thicker than any layer 15 of second die half 16. First baseplate 60 and second baseplate 62 may be substantially solid plates, such that they do not form a portion of first die cavity 18 or second die cavity 20, respectively. First baseplate 60 may be configured to support and/or strengthen first die half 14 and/or to reduce the number of layer interfaces (e.g., reduce the number of layers 15) of first die half 14. Similarly, second baseplate 62 may be configured to support and/or strengthen second die half 16 and/or to reduce the number of layer interfaces of second die half 16. In some examples, first baseplate 60 and/or second baseplate 62 may be shared amongst multiple die sets, which may decrease costs and/or increase efficiency in making disclosed forging dies 12.

In some specific examples, first layer 24 is thicker than second layer 28 of first die half 14. For example, first layer 24 may be at least twice as thick as second layer 28. Similarly, third layer 44 is thicker than fourth layer 46 of second die half 16, in some examples. For example, third layer 44 may be at least twice as thick as fourth layer 46. First layer 24 of first die half 14 and third layer 44 of second die half 16 generally represent the center-most layers of forging die 12, adjacent where first die half 14 and second die half 16 are engaged with one another during forging. In some examples, first layer 24 forms a larger respective portion of first die cavity 18 than other layers 15 of first die half 14 (e.g., first portion 26 of first die cavity 18 may be larger than the other respective portions cut from the other respective layers 15 of first die cavity 18). Similarly, third layer 44 forms a larger respective portion of second die cavity 20 than other layers 15 of second die cavity 20 in some examples (e.g., first portion 48 of second die cavity 20 may be larger than the other respective portions cut from the other respective layers 15 of second die cavity 20). Accordingly, first layer 24 and third layer 44 may be thicker than other respective layers 15 to account for additional stresses that may be experienced in the first and third layers of first die half 14 and second die half 16, respectively. In some examples, first baseplate 60 is thicker than any other layer of first die half 14, such as being at least twice as thick as any other layer 15. Similarly, second baseplate 62 may be thicker than any other layer of second die half 16, such as being at least twice as thick as any other layer 15. In one specific example, first layer 24 and third layer 44 may each be between 20-40 mm thick, second layer 28 and fourth layer 46 may each be between 10-20 mm thick, and first baseplate 60 and second baseplate 62 may each be between 50-90 mm thick.

Layers 15 generally are configured to be cut before being stacked and fastened together to form respective die halves 14, 16. For example, each of first layer 24, second layer 28, third layer 44, fourth layer 46, and/or any intervening layer 36 may be configured to be water jet cut in order to form first die cavity 18 and/or second die cavity 20, respectively. Said layers 15 may be cut to form sections of the die cavities using any suitable technique, including but not limited to laser cutting, water jet cutting, band saw (or other saw) cutting, machining, milling, and/or plasma cutting.

First plurality of fasteners 32 and second plurality of fasteners 58 may be any suitable fasteners, and may be configured to be selectively removable, such that one or more layers 15 may be removable from a respective die half. In some examples, first plurality of fasteners 32 includes a plurality of bolts securing the layers of first die half 14 together, and second plurality of fasteners 58 likewise may include a plurality of bolts securing the layers of second die half 16 together. In other examples, fasteners 32, 58 may include screws, nuts, rivets, inserts, clamps, clips, brackets, nails, posts, studs, anchors, and/or any other suitable fastener. Each respective fastener of first plurality of fasteners 32 may extend through at least a portion of one or more layers of first die half 14. In some examples, at least some respective fasteners of first plurality of fasteners 32 extend through all the layers of first die half 14. In some examples, at least some respective fasteners of first plurality of fasteners 32 extend through just some of the layers of first die half 14, such as through at least two respective layers 15 of first die half 14. Similarly, each respective fastener of second plurality of fasteners 58 may extend through at least a portion of one or more layers 15 of second die half 16. In some examples, at least some respective fasteners of second plurality of fasteners 58 extend through all the layers of second die half 16. In some examples, at least some respective fasteners of second plurality of fasteners 58 extend through just some of the layers of second die half 16, such as through at least two respective layers of second die half 16.

In some examples, each fastener of first plurality of fasteners 32 is spaced apart from first die cavity 18, such that fasteners 32 do not enter first die cavity 18. Similarly, in some examples, each fastener of second plurality of fasteners 58 is spaced apart from second die cavity 20, such that fasteners 58 do not enter second die cavity 20. Fasteners 32 may be configured such that when the layers 15 of first die half 14 are assembled and secured together, adjacent respective layers 15 are in contact with one another. Similarly, fasteners 58 may be configured such that when the layers 15 of second die half 16 are assembled and secured together, adjacent respective layers 15 are in contact with one another. In some examples, each respective layer 15 is selectively removable from first die half 14 by removing one or more of the fasteners 32, and each respective layer 15 is selectively removable from second die half 16 by removing one or more of the fasteners 58. In this manner, if a given layer 15 is worn or in need of replacement (e.g., due to wear occurring during forging, transport, or otherwise), the worn layer may be selectively removed from the assembled first die half 14 or second die half 16, and replaced with a new layer that has been cut to form the same respective portion of the respective die cavity as the removed layer. In this manner, forging dies 12 according to the present disclosure may be easier to maintain and repair than conventional forging dies, because repairs may be carried out by replacing individual layers rather than needing to replace an entire die half.

Different respective layers 15 of forging die 12 may be formed of different materials from other respective layers 15, in some examples. For example, at least one of first layer 24, second layer 28, third layer 44, fourth layer 46, first baseplate 60, second baseplate 62, and/or any additional layer 36 of first die half 14 and/or second die half 16 may be formed of a different material or grade of material than at least one other of first layer 24, second layer 28, third layer 44, fourth layer 46, first baseplate 60, second baseplate 62, and/or any additional layer 36 of first die half 14 and/or second die half 16. In some examples, first layer 24 is formed of a different material or different grade of material than is second layer 28 and/or any intervening layers 36 of first die half 14. For example, first layer 24 may be thicker than second layer 28 and/or additional layers 36 of first die half 14. Additionally or alternatively, first layer 24 may be formed of a stronger material than second layer 28 and other layers 36 of first die half 14. In one specific example, first layer 24 may be formed of tool steel, while second layer 28 and any intervening layers 36 of first die half 14 may be formed of strip steel, or another material or grade of steel. "Tool steel" refers to a variety of carbon and alloy steels that are configured for use in the manufacture of tools. For example, suitable tool steel materials may have a distinctive hardness, resistance to abrasion and deformation, and/or a distinctive ability to hold a cutting edge at elevated temperatures. In some examples, tool steel has a carbon content of between 0.5% and 1.5%. Tool steels may also include tungsten, chromium, vanadium, and/or molybdenum. As used herein, a material is considered stronger than another material if the stronger material is more wear-resistant, has a higher hardness, has a higher tensile and/or compression strength, and/or has a higher toughness than the other material. In some examples, a higher strength material may be used for a particular respective layer 15 (or multiple respective layers 15) to add strength to forging die 12 without needing to use the higher strength material at every layer. Additionally or alternatively, a higher strength material may be used for one or more respective layers 15, while a higher ductile material may be used for one or more other respective layers 15, thereby providing forging die 12 with good overall strength and ductility of the die. In some examples, different respective layers 15 may be configured to be more oxidation-resistant than other respective layers 15.

Similarly, in some examples, third layer 44 is formed of a different material or different grade of material than is fourth layer 46 and/or any intervening layers 36 of second die half 16. For example, third layer 44 may be formed of a stronger material than fourth layer 46 and other layers 36 of second die half 16. In one specific example, third layer 44 may be formed of tool steel, while fourth layer 46 and any intervening layers 36 of second die half 16 may be formed of strip steel, or a different material or grade of steel. Additionally or alternatively, third layer 44 may be thicker than fourth layer 46 and/or additional layers 36 of second die half 16.

In some examples, forging die 12 may include one or more sensors 66 encapsulated in first die half 14 and/or one or more sensors 66 encapsulated in second die half 16. For example, sensors 66 may be configured to monitor and/or measure data from first die half 14 and/or second die half 16 during forging of the part, and/or during heating of forging die 12. For example, sensors 66 may be configured to measure a temperature of first die half 14, a temperature of second die half 16, a temperature of the part being forged, and or the amount of forging lubricant within forging die 12.

Some examples of forging die 12 include one or more cooling channels 68 and/or one or more heating channels 70. Cooling channels 68 may be formed in first die half 14 and/or second die half 16, and may extend through one or more respective layers 15 of the die half. Cooling channels 68 may be configured to deliver a cooling fluid to different internal locations within first die half 14 and/or second die half 16, thereby cooling first die half 14, second die half 16, and/or any preform 22 or part located within first die cavity 18 and/or second die cavity 20. Similarly, heating channels 70 may be formed in first die half 14 and/or second die half 16, and may extend through one or more respective layers 15 of the die half. Heating channels 70 may be configured to deliver a heating fluid to different internal locations within first die half 14 and/or second die half 16, thereby heating first die half 14, second die half 16, and/or any preform 22 or part located within first die cavity 18 and/or second die cavity 20. In some examples, the same channel may serve as both a heating channel 70 and a cooling channel 68. For example, a channel may deliver cooling fluid to forging die 12 during a first period of time during the forging process, and may deliver heating fluid to forging die 12 during a second period of time during the forging process. Additionally or alternatively, cooling channels 68 and/or heating channels 70 may be used to provide protective atmospheric gases and/or lubricant to forging die 12. Additionally or alternatively, heating elements, such as electric cartridge heaters, may be positioned within cooling channels 68 and/or heating channels 70 to heat forging die 12.

Forging dies 12 may include one or more slots 72 formed in first die half 14 and/or second die half 16. Such slots 72 may house a strain gauge configured to monitor and/or measure strain within one or more layers 15 of first die half 14 and/or within one or more layers 15 of second die half 16. Additionally or alternatively, forging dies 12 may include drafts and/or fillets incorporated into first die half 14 and/or second die half 16, wherein the drafts and/or fillets are configured to facilitate removal of the part from first die half 14 and/or second die half 16 after forging In some examples. Additionally or alternatively, such drafts and/or fillets may be configured to facilitate metal flow within first die cavity 18 and/or second die cavity 20 during forging. Forging dies 12 according to the present disclosure may be used to make forgings that are close-to-finished forgings in some examples. Additionally or alternatively, forging dies 12 may be used to make forgings that pre-shape a raw material, and/or forgings (e.g., parts) having drafts or fillets that are intended to be further machined after forging, to create the final part. In some examples, a series of blocker and finishing dies may be used, which may be made according to methods of the present disclosure, or may be made according to conventional methods.

Additionally or alternatively, forging dies 12 may include one or more reinforcement elements (also referred to herein as reinforcing elements, or reinforcing bars) configured to strengthen the respective die halves and/or to resist movement of respective layers 15 relative to one another within a given die half 14, 16. For example, first die half 14 may include a first reinforcing element 74, which may be secured to a first outer surface 78 of first die half 14 and/or to first baseplate 60. In some examples, first outer surface 78 is the outer surface of second layer 28. Additionally or alternatively, second die half 16 may include a second reinforcing element 76, which may be secured to upper surface 64 of second die half 16 and/or to second baseplate 62. Reinforcing elements 74, 76 may be welded to respective die halves 14, 16, or may be secured to the die halves in any other suitable manner. In some examples, reinforcing elements 74, 76 may take the form of a square bar, though they are not limited to such.

Forging die 12 may be used to form various different parts, such as metallic parts, glass parts, composite parts, ceramic parts, and/or plastic parts. In some examples, layered dies may be made according to the present disclosure for use in compression molding for composites or plastics, or for forming dies for glass or ceramics. In some cases, parts forged in presently disclosed forging dies may be large parts, such as having a length or radius of at least 1 foot. Forged parts may be used in many different applications, including but not limited to parts for aircraft, vehicles, big frame production, and/or marine craft. Any suitable preform 22 may be used with forging die 12, such as billets, bars, blanks, ingots, blooms, slabs or other semi-finished casting products. Preform 22 may be formed of any suitable material, including but not limited to metals, metal alloys, ceramics, and plastics.

In use, at least a portion of a preform 22 is positioned within first die cavity 18 and/or second die cavity 20, and first die half 14 and second die half 16 are then engaged with one another such that they are brought together (e.g., along arrow 25) and pressed together, thereby forcing preform 22 to be shaped according to the shape of first die cavity 18 and/or second die cavity 20. During forging, excess material of preform 22 may be forced away from the preform. Forging die 12 may be configured to substantially prevent such excess material from getting in between respective layers of first die half 14 or second die half 16. For example, first die half 14 may include enough fasteners 32 that are positioned sufficiently to prevent introduction of excess material from preform 22 into spaces or areas between adjacent respective layers 15 of first die half 14 during forging of the part. First fasteners 32 may also be configured to substantially prevent movement (e.g., lateral sliding) of respective adjacent layers 15 of first die half 14 with respect to one another during forging. In this manner, first fasteners 32 may be configured to maintain integrity of first die half 14 during forging of the part. In some examples, first die half 14 may include at least five, at least ten, at least fifteen, at least twenty, at least thirty, at least forty, and/or at least fifty fasteners 32. In some specific examples, first fasteners 32 may be M20 screws, though any suitable fastener may be used for first fasteners 32. In some examples, first fasteners 32 may include one or more keyways configured to prevent respective layers 15 from sliding or laterally moving with respect to one another.

Similarly, second die half 16 may include a plurality of fasteners 58 that are positioned sufficiently to prevent introduction of excess material from preform 22 into spaces or areas between adjacent respective layers 15 of second die half 16 during forging of the part. Second fasteners 58 may also be configured to substantially prevent movement (e.g., lateral sliding) of respective adjacent layers 15 of second die half 16 with respect to one another during forging. In this manner, second fasteners 58 may be configured to maintain integrity of second die half 16 during forging of the part. In some examples, second die half 16 may include at least five, at least ten, at least fifteen, at least twenty, at least thirty, at least forty, and/or at least fifty fasteners 58. In some specific examples, second fasteners 58 may be M20 screws, though any suitable fastener may be used for second fasteners 58. In some examples, second fasteners 58 may include one or more keyways configured to prevent respective layers 15 from sliding or laterally moving with respect to one another.

When forging a part in forging die 12, first die half 14 and second die half 16 may be loaded into a forging press 77 that is configured to press the die halves 14, 16 together and apply pressure to the die halves, thereby forging the part within first die cavity 18 and/or second die cavity 20. Forging press 77 may be any suitable type of press, though in some examples is a hydraulic press. In some examples, forging press 77 is configured to have a ram velocity of at least 5 mm/s and exert at least 50 MegaPascal (MPa) of force onto forging die 12. While not limited to the same, in some examples, forging press 77 is configured to exert a force of between 55-1,000 MPa (80-140 kilopounds per square inch (KSI)) on forging die 12. Some systems 10 include a furnace 80 and/or other heating element configured to heat preform 22 and/or forging die 12 before and/or during forging the part. In some examples, the first use of forging die 12 results in deformation of first layer 24 and/or third layer 44 such that a first perimeter ridge 71 is formed around a first perimeter 79 (FIG. 2) of first die cavity 18 and/or such that a second perimeter ridge 73 is formed around a second perimeter 81 (FIG. 2) of second die cavity 20. Additionally or alternatively, the first use of forging die 12 may result in a deformation in the form of displacement of first layer 24 and/or first portion 26 of first die cavity 18 with respect to an adjacent respective layer 15, and/or displacement of third layer 44 and/or first portion 48 of second die cavity 20 with respect to an adjacent respective layer.

Once forging is complete, the resulting forged part is removed from forging die 12, such as by separating first die half 14 and second die half 16. In some examples, first die half 14 and second die half 16 are separated by moving one respective die half away from the other die half, or by moving both die halves away from each other. In other examples, first die half 14 and second die half 16 may be hinged together, such that separating the die halves may be accomplished by pivoting one or both die halves away from the other.

Disclosed forging dies 12 may facilitate the manufacture of such forging dies more rapidly than conventional forging dies may be made. For example, because each respective layer 15 being cut is generally relatively thin as compared to the overall thickness of the die half, each layer 15 may be cut faster than would be typical for machining a die cavity into a solid block of material. Disclosed methods of making such forging dies may enable new forging dies to be easily made for old parts. In some examples, forging dies 12 are used to make a relatively low number of parts and then may be treated as disposable, due to the low cost and time consumption for making disclosed forging dies 12, as compared to conventional forging dies.

Turning now to FIGS. 2-12, illustrative non-exclusive examples of forging dies 12, layers 15 for forming forging dies 12, preforms 22, and forged parts are illustrated. Where appropriate, the reference numerals from the schematic illustration of FIG. 1 are used to designate corresponding parts in FIGS. 2-12; however, the examples of FIGS. 2-12 are non-exclusive and do not limit forging dies 12, layers 15 for forming forging dies 12, preforms 22, or forged parts to the illustrated embodiments of FIGS. 2-12. That is, forging dies 12, layers 15 for forming forging dies 12, preforms 22, and forged parts are not limited to the specific embodiments illustrated and may incorporate any number of the various aspects, configurations, characteristics, properties, etc. that are illustrated in and discussed with reference to the schematic representation of FIG. 1 and/or the embodiments of FIGS. 2-12, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again in each of FIGS. 2-12; however, it is within the scope of the present disclosure that the previously discussed features, variants, etc. may be utilized with these embodiments.

Figure 2:
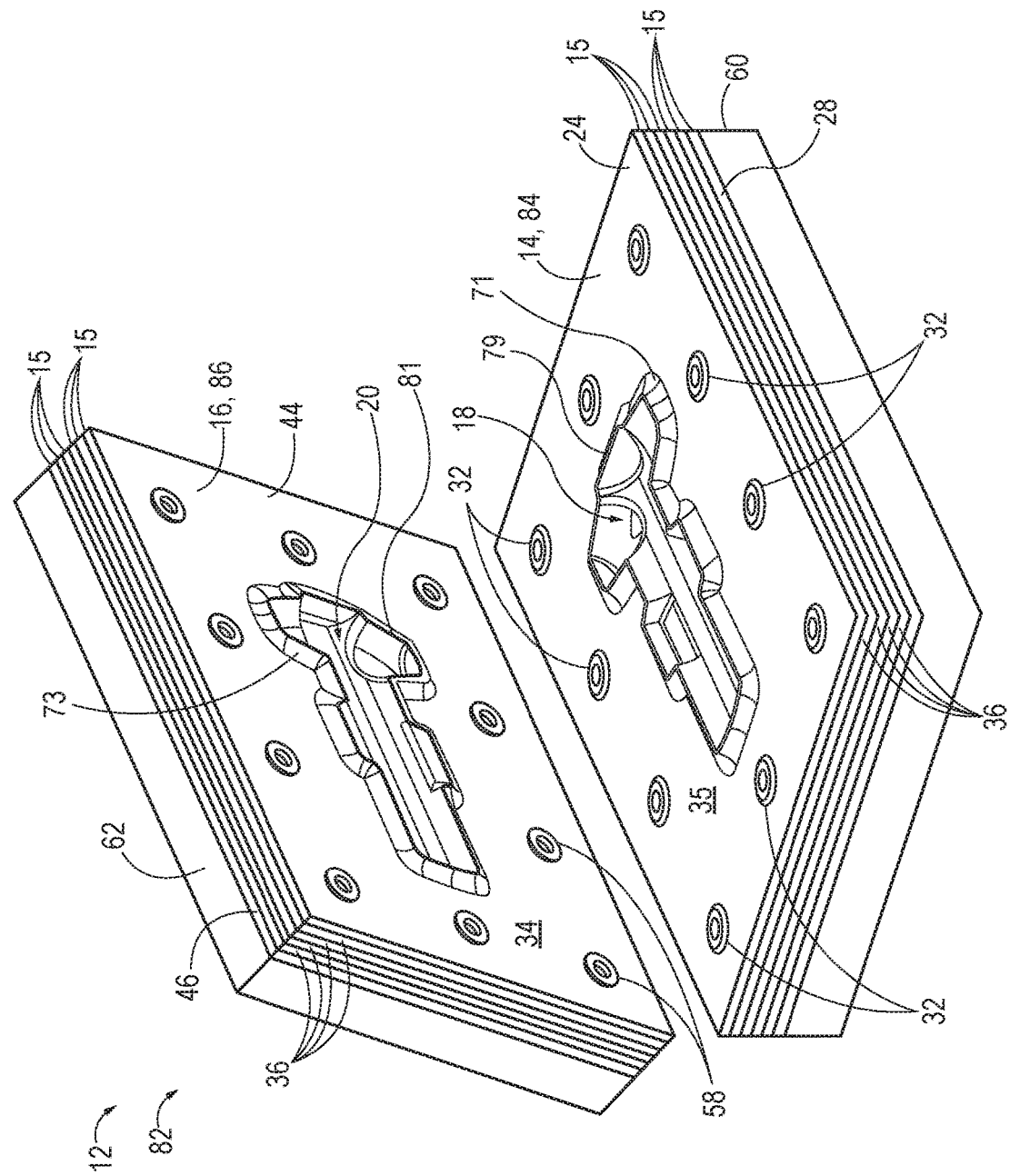
FIG. 2 is a perspective view of an example of a forging die according to the present disclosure.

FIG. 2 illustrates a forging die 82, which is an example of forging die 12, before or after being used to forget a part. Forging die 82 includes a first die half 84 (which is an example of first die half 14) and a second die half 86 (which is an example of second die half 16). First die half 84 includes first die cavity 18 that extends through a plurality of layers 15 that are stacked as shown to form first die half 84. In this example, first layer 24 is positioned on top of the other respective layers of first die half 84, and thus first engagement surface 35 of first layer 24 faces second die half 86 when the two die halves are engaged with one another to forge a part. As shown in FIG. 2, a portion (e.g., first perimeter ridge 71) of first engagement surface 35 may be raised with respect to the rest of first engagement surface 35, such as in areas adjacent first perimeter 79 of first die cavity 18. First die half 84 also includes second layer 28 and four intervening layers 36 positioned between first layer 24 and second layer 28. First baseplate 60 is secured to second layer 28 in this example. A plurality of fasteners 32 are positioned around first die cavity 18 to secure layers 15 together and with respect to one another, to form first die half 84. More or fewer fasteners 32 may be included in variations of this example. Similarly, more or fewer intervening layers 36 may be included in different variations. In the example of FIG. 2, all of layers 15 are of a substantially uniform thickness (other than portions of the respective layers that are cut to form first die cavity 18), with first baseplate 60 being thicker than each respective layer 15 of first die half 84, though in other examples, layers 15 are of varying thicknesses.

In the example of FIG. 2, second die half 86 is essentially a mirror image of first die half 84, with second die half 86 including third layer 44 and fourth layer 46, with four intervening layers 36 positioned therebetween. Second baseplate 62 is secured to fourth layer 46, and a plurality of fasteners 58 are positioned around second die cavity 20 to secure layers 15 of second die half 86 together and with respect to one another. Third layer 44 includes second engagement surface 34, which faces first die half 84 when the two die halves are engaged with one another. As shown in FIG. 2, a portion (e.g., second perimeter ridge 73) of second engagement surface 34 may be raised with respect to the rest of second engagement surface 34, such as in areas adjacent second perimeter 81 of second die cavity 20. When first die half 84 and second die half 86 are engaged with one another, first die cavity 18 and second die cavity 20 are aligned with one another such that the desired part is forged in forging die 82 when the die halves are pressed together. In other examples, second die half 86 may be arranged differently, such that it is not a mirror image of first die half 84 (e.g., forging die 82 may be asymmetrical). In use, a preform (e.g., preform 22) is positioned within first die cavity 18 and/or second die cavity 20, and then first die half 84 and second die half 86 are brought together to engage with one another, such that a portion of the preform is positioned in each of first die cavity 18 and second die cavity 20. Accordingly, when forging die 82 is pressed together, the preform is shaped according to the die cavities.

Figure 3:
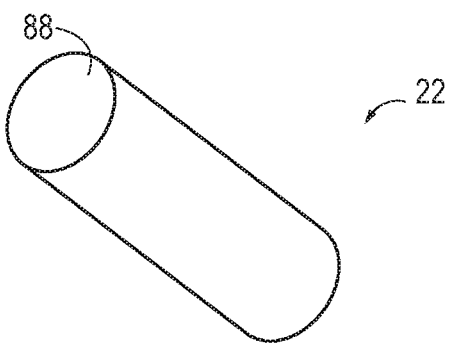
FIG. 3 is a perspective view of an example of a preform that may be shaped in forging dies according to the present disclosure.
Figure 4:
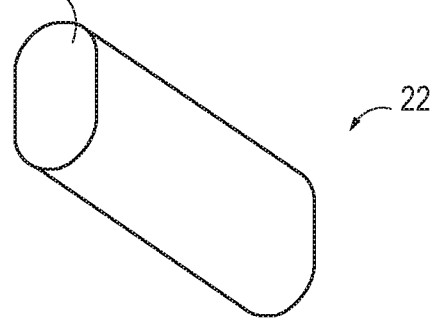
FIG. 4 is a perspective view of another example of a preform that may be shaped in forging dies according to the present disclosure.
Figure 5:
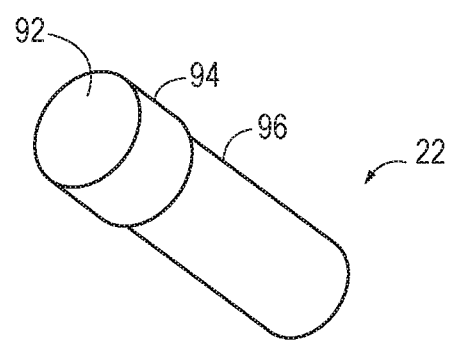
FIG. 5 is a perspective view of another example of a preform that may be shaped in forging dies according to the present disclosure.
Figure 6:
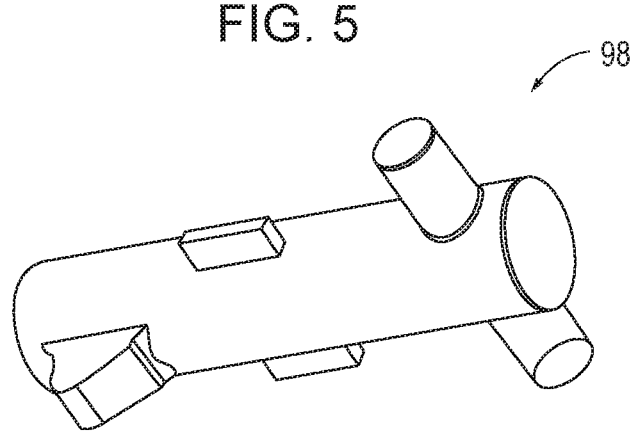
FIG. 6 is a perspective view of an example of a part that may be forged from a preform, in presently disclosed forging dies.

FIGS. 3-5 illustrate representative examples of suitable preforms 22, though suitable preforms are not limited to these examples, and may take a variety of shapes and sizes, with suitable preforms being selected depending on the geometry of the part to be forged. FIG. 3 illustrates a cylindrical preform 88. FIG. 4 illustrates an elongated preform 90 having an oval-shaped cross-sectional area. FIG. 5 illustrates a billet 92 that is substantially cylindrical, but that includes a first, larger diameter portion 94, and a second, smaller diameter portion 96. In other examples, preforms may have a substantially rectangular, square, polygonal, and/or irregular cross-sectional area. In some examples, preform 22 may be tapered and/or include fillets. In some examples, the preform geometry may be selected based on press load, where the preform geometry resulting in the lowest stresses in the forging die during forging is used to forge the part. FIG. 6 illustrates a representative part 98 that may be forged in presently disclosed forging dies, with the part 98 having features resulting from the shape of first die cavity 18 and second die cavity 20 of the forging die used to make part 98.

Figure 7:
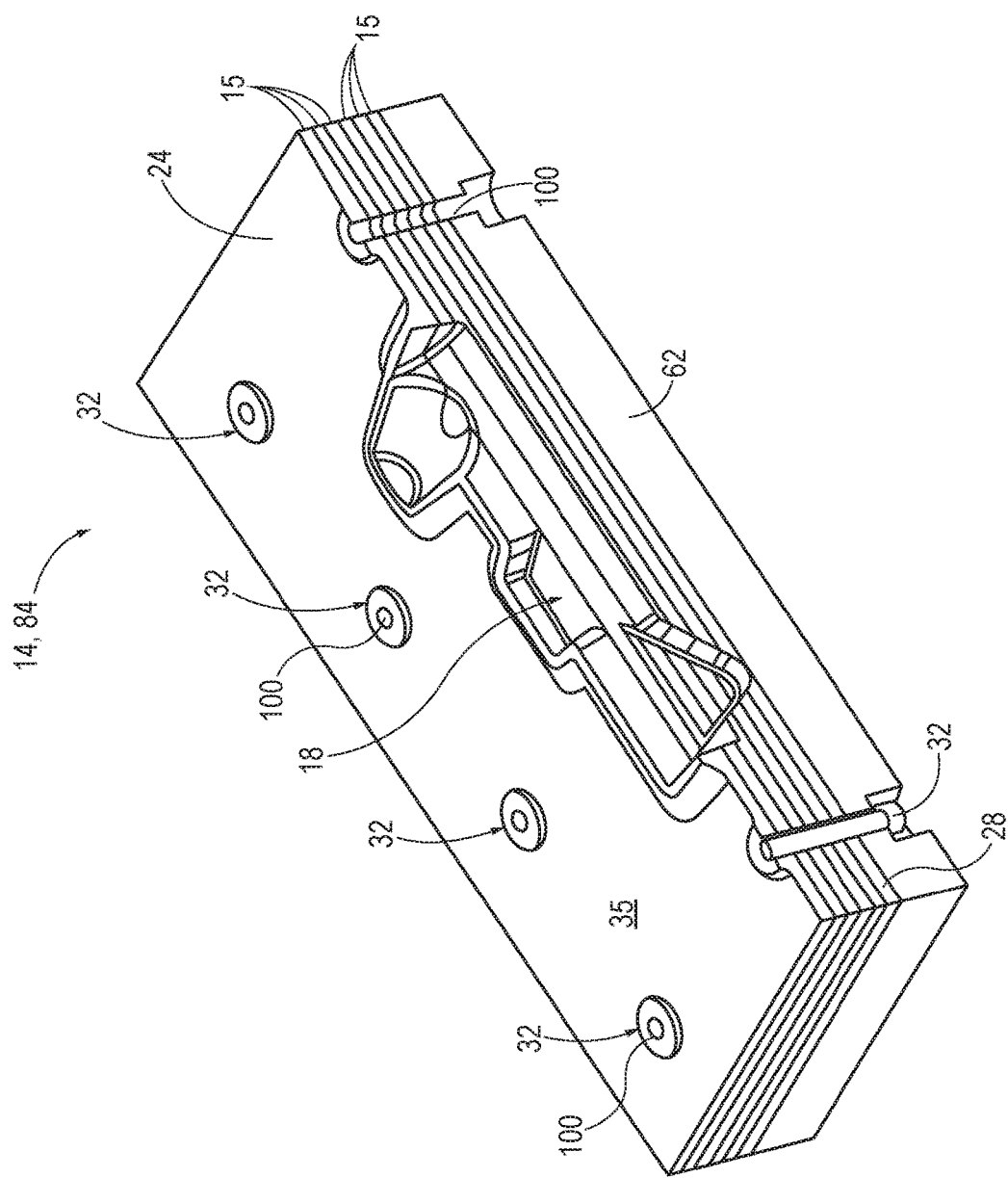
FIG. 7 is a partial cut-away view of an example of a first die half of a forging die according to the present disclosure.

FIG. 7 illustrates a cut-away view of a portion of first die half 84 from FIG. 2, showing variations in how each layer 15 is cut to form first die cavity 18. As shown in FIG. 7, each layer 15 may be cut to form first die cavity 18, with the respective layers being positioned with respect to one another such that the cut portions are aligned to form first die cavity 18 when the layers are stacked and assembled together. First baseplate 60 is not cut to form a portion of first die cavity 18. A plurality of holes 100 are formed through first die half 84, as shown, for receiving fasteners 32 such that fasteners 32 secure the layers 15 of first die half 84 together. As shown in FIG. 7, holes 100 may extend through the entire first die half 84 (including through first baseplate 60), in some examples. Holes 100 are positioned so as not to interfere with first die cavity 18.

Figure 8:
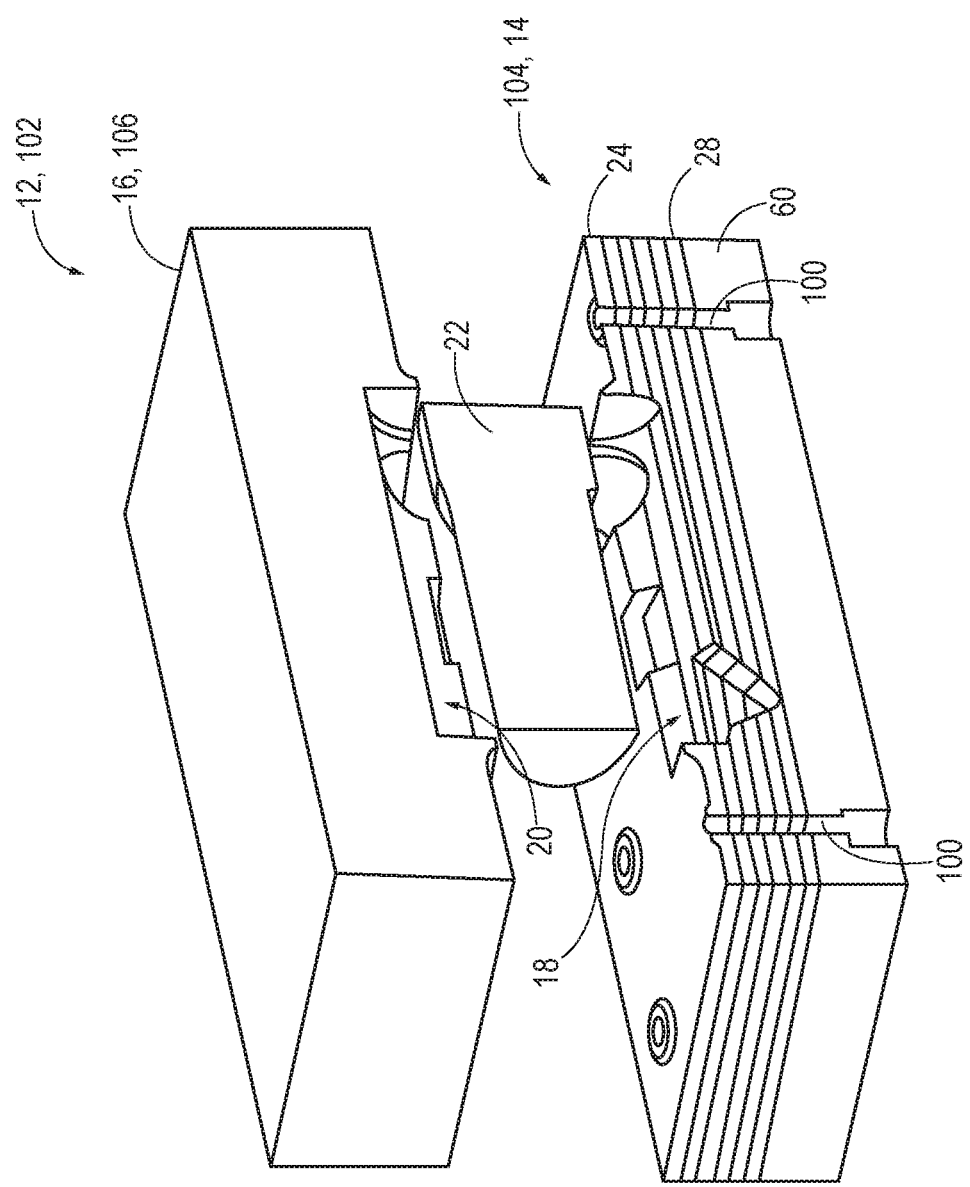
FIG. 8 is a partial cut-away, exploded view of an example of a forging die according to the present disclosure, showing a preform that may be shaped in the forging die.

FIG. 8 illustrates an exploded, cut-away view of a forging die 102, which is an example of forging die 12. A first die half 104 (which is an example of first die half 14) is configured to be engaged with a second die half 106 (which is an example of second die half 16) such that first die cavity 18 and second die cavity 20 are aligned with one another and facing one another to forge a part therein, such as from preform 22. Forging die 12 and preform 22 are shown in cut-away such that first die cavity 18 and second die cavity 20 are visible, though generally the die cavities are spaced away from the outer edges of the die halves, as best seen in FIG. 2. In this example, first die half 104 is formed from a plurality of layers that are described herein, while second die half 106 is formed of a single layer having second die cavity 20 formed therein. In other examples, second die half 106 may be formed of a single layer of material and/or may not include second die cavity 20, such that substantially all of preform 22 is positioned within first die cavity 18 during forging. Forging die 102 may include one or more alignment pins or other alignment structures to facilitate alignment of first die half 104 with respect to second die half 106 (e.g., to facilitate alignment of first die cavity 18 and second die cavity 20).

Figure 9:
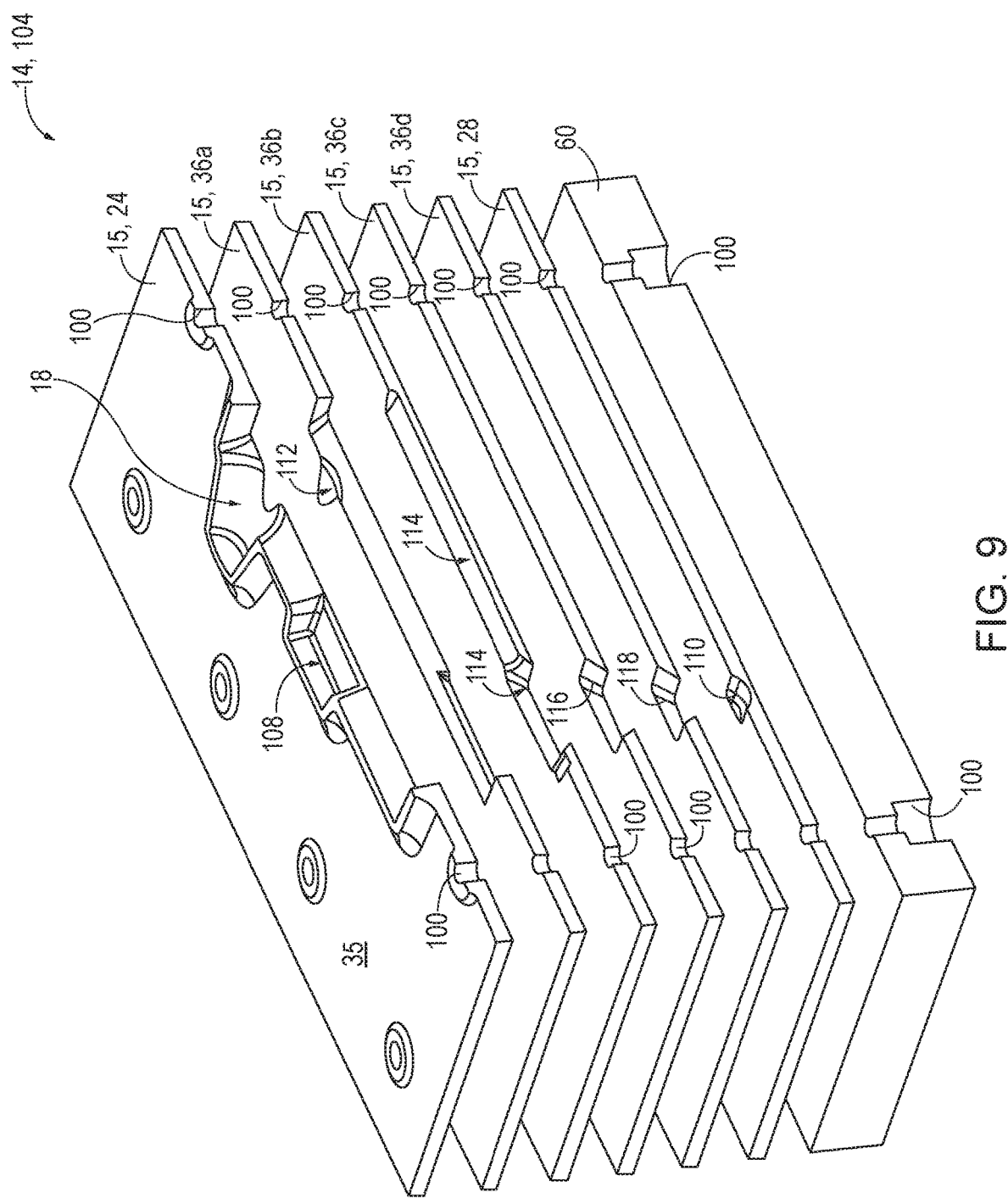
FIG. 9 is an exploded, cut-away view of a portion of a first die half of a forging die according to the present disclosure.

FIG. 9 illustrates an exploded, cutaway view of first die half 104 of FIG. 8, with the layers 15 shown separated from one another for illustration purposes. First die half 104 is shown cut-away such that essentially half of first die half 104 is not shown, in order to more clearly illustrate the different sections of first die cavity 18 and how the layers 15 of first die half 104 together form the cavity. Each of first layer 24, second layer 28, intervening layer 36a, intervening layer 36b, intervening layer 36c, and intervening layer 36d is cut to form a respective portion of first die cavity 18. For example, first layer 24 is cut to form a first portion 108 of first die cavity 18, second layer 28 is cut to form a second portion 110 of first die cavity 18, intervening layer 36a is cut to form a third portion 112 of first die cavity 18, intervening layer 36b is cut to form a fourth portion 114 of first die cavity 18, intervening layer 36c is cut to form a fifth portion 116 of first die cavity 18, and intervening layer 36d is cut to form a sixth portion 118 of first die cavity 18. When layers 15 of first die half 104 are stacked in the prescribed order, the respective portions cut into the respective layers align to form the desired first die cavity 18.

Figure 10:
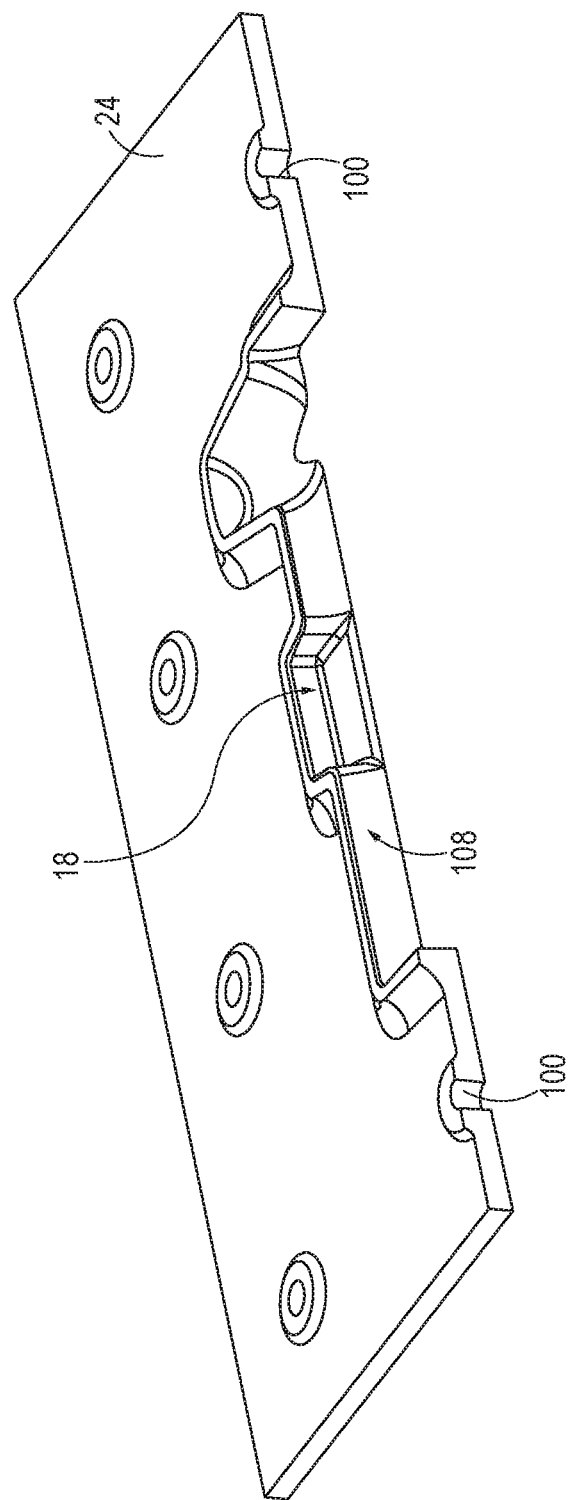
FIG. 10 is a partial cutaway view of the first layer of the first die half of FIG. 9.
Figure 11:
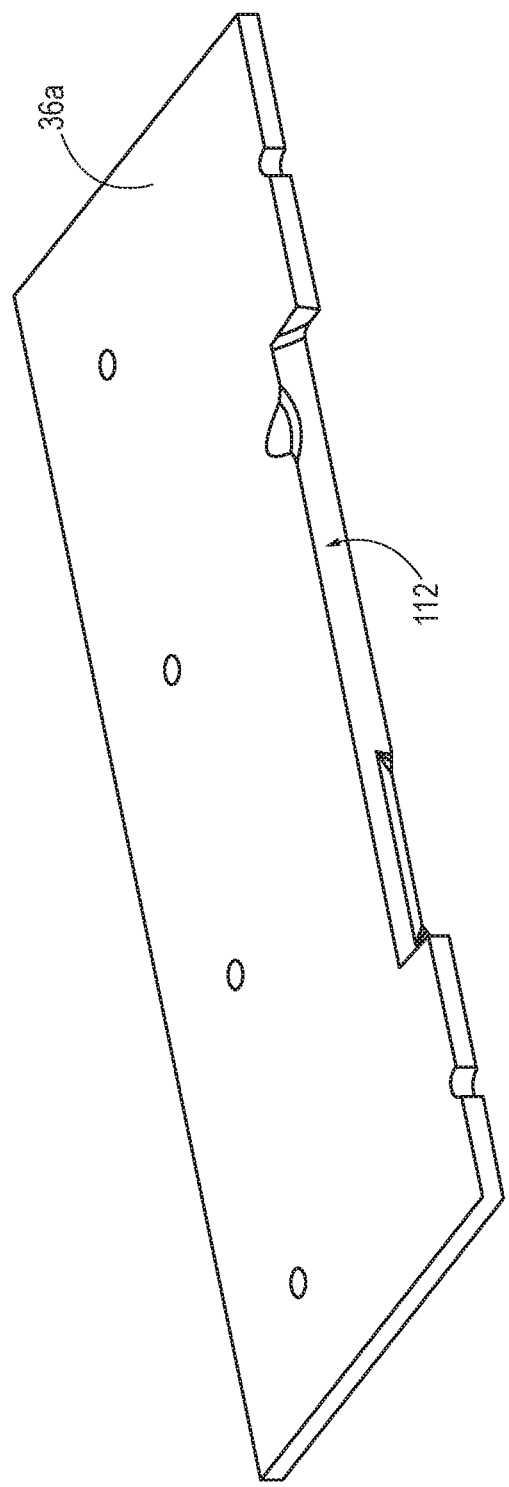
FIG. 11 is a partial cutaway view of another layer of the first die half of FIG. 9.
Figure 12:
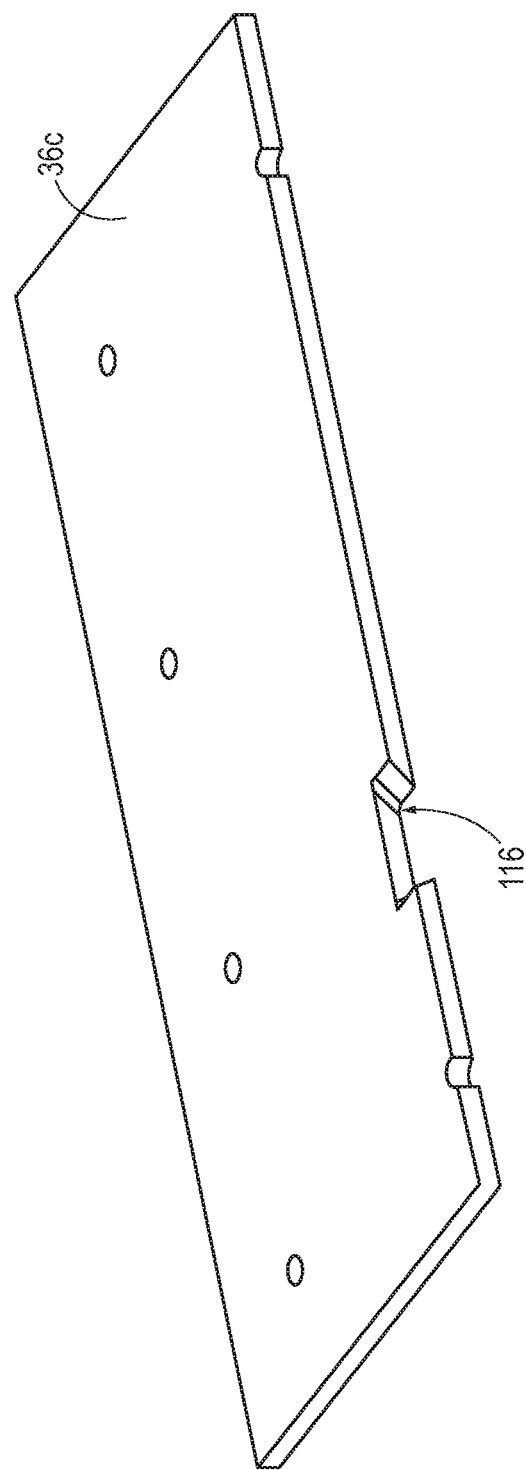
FIG. 12 is a partial cutaway view of yet another layer of the first die half of FIG. 9.

A selection of respective layers 15 of first die half 104 are illustrated separately, for clarity. FIG. 10 shows first layer 24 of first die half 104 and first portion 108 of first die cavity 18 formed therein. FIG. 11 shows intervening layer 36a and third portion 112 of first die cavity 18. FIG. 12 shows intervening layer 36c and fifth portion 116 of first die cavity 18. As illustrated, in this example, each respective portion of first die cavity 18 is unique, such that each respective layer 15 is distinct from one another. Layers 15 are thus stacked in a particular order to form first die half 104, such that the cut portions are arranged with respect to one another to create first die cavity 18. In other examples, one or more layers of a given die half may be substantially identical to one another.

Figure 13:
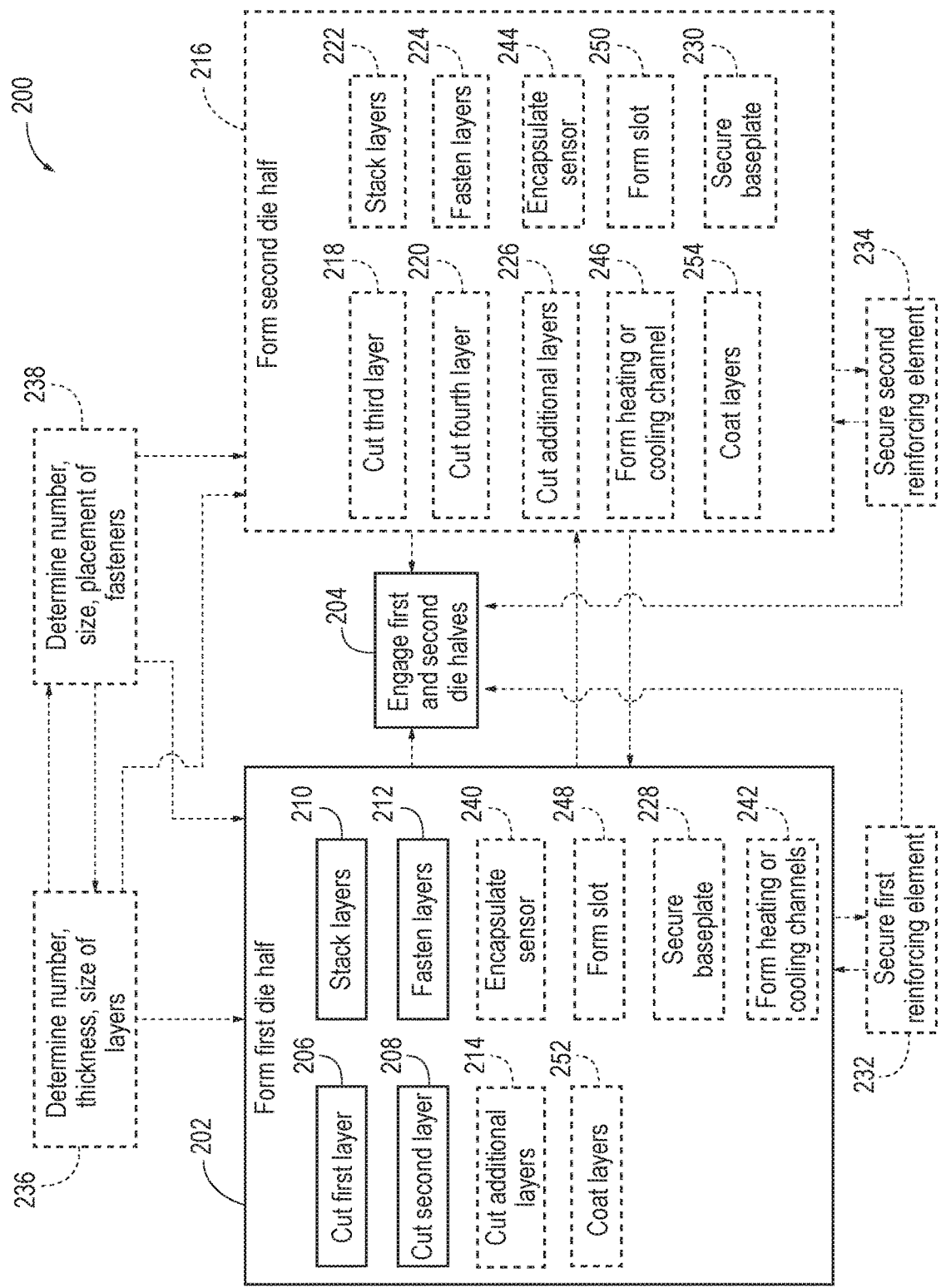
FIG. 13 is a flowchart schematically representing methods of making forging dies, according to the present disclosure.
Figure 14:
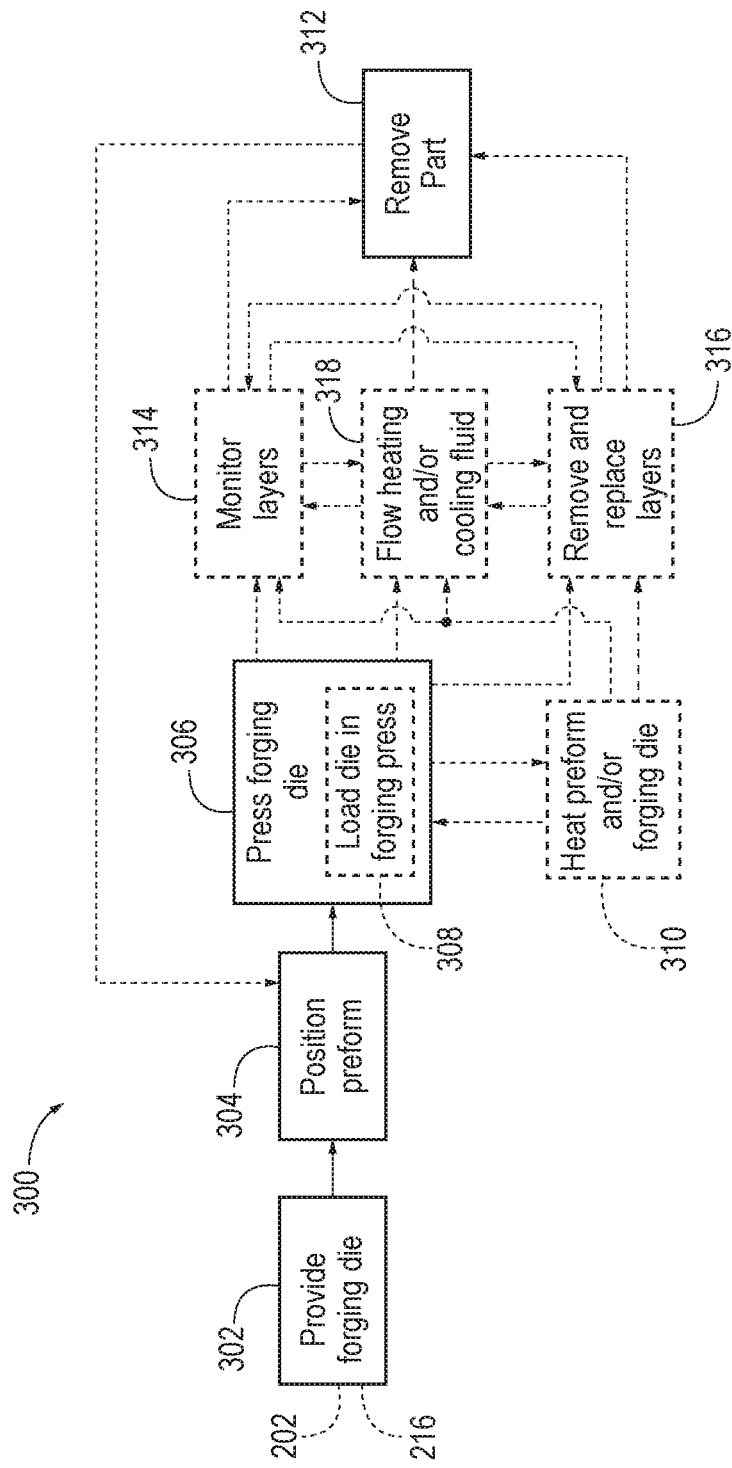
FIG. 14 is a flowchart schematically representing methods of making a part using forging dies, according to the present disclosure.

FIGS. 13-14 schematically provide flowcharts that represent illustrative, non-exclusive examples of methods according to the present disclosure. In FIGS. 13-14, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIGS. 13-14 are not limiting and other methods and steps are within the scope of the present disclosure, including methods having greater than or fewer than the number of steps illustrated, as understood from the discussions herein.

FIG. 13 illustrates methods 200 of making a forging die (e.g., forging die 12) for forging a part from a preform (e.g., preform 22), such as a bar, a blank, and/or a billet. Methods 200 generally include forming a first die half (e.g., first die half 14) at 202, and engaging the first die half with a second die half (e.g., second die half 16) at 204, such that a first die cavity (e.g., first die cavity 18) faces the second die half (and/or a second die cavity of the second die half, such as second die cavity 20). Forming the first die half at 202 generally includes cutting a first layer (e.g., first layer 24) to form a first portion of the first die cavity (e.g., first portion 26) at 206, cutting a second layer (e.g., second layer 28) to form a second portion of the first die cavity (e.g., second portion 30) at 208, stacking the first layer and the second layer together at 210, and fastening the first layer and the second layer together at 212. Stacking the first layer and the second layer together at 210 includes positioning the first layer with respect to the second layer to form an assembly or laminate, such that the first and second portions are positioned with respect to one another to form the first die cavity. Fastening the first and second layers together at 212 may include fastening the layers together (e.g., via first plurality of fasteners 32) and/or otherwise binding them together, such as via an adhesive or other fastening means. In some examples, fastening the first and second layers together at 212 may include inserting one or more keyways into the forging die to maintain alignment of the layers of the forging die. Additionally or alternatively, stacking the first and second layer together at 210 and/or fastening the first and second layers at 212 may include dressing one or more interfaces between layers, to create smooth, continuous layer interfaces and/or die cavities.

In some methods 200, forming the first die half at 202 includes cutting one or more additional layers (e.g., one or more intervening layers 36) at 214. In these examples, each additional layer is cut to form a respective portion of the first die cavity, and the stacking the layers at 210 includes stacking the additional layers between the first layer and the second layer such that the cut portions are aligned and the layers are arranged in the appropriate order to form the desired first die cavity. Fastening the layers at 212 may include selectively and removably fastening (e.g., bolting) the layers together such that any respective layer may be removed from the assembled first die half by removing one or more of the fasteners. In such methods, a worn layer may be removed and replaced with a replacement layer for maintenance of the first die half, without needing to replace the entire die half.

The cutting the first layer at 206, the cutting the second layer at 208, and the cutting any additional layers at 214 generally are performed prior to the fastening the layers together at 212 and prior to the stacking the layers at 210. In this manner, each respective layer may be cut individually, which may reduce wear on cutting tools during the making of the disclosed forging dies, as compared to conventional forging dies formed from solid blocks of material. Cutting the layers at 206, 208, and/or 214 is generally performed via water cutting, though any cutting technique is within the scope of the present disclosure, such as laser cutting, band saw (or any saw) cutting, machining, milling, and/or plasma cutting. Methods 200 of making presently disclosed forging dies may be configured to be performed more quickly or easily than conventional methods of forming forging dies, as presently disclosed methods 200 generally do not include needing to shape the plates with machine contoured surfaces; it is simply a matter of cutting the die cavity into each respective layer.

In some methods 200, the second die half may be a solid and/or flat die half, such that the first die cavity in the first die half receives substantially the entire preform (e.g., the first die cavity is essentially sized and shaped according to the entire desired part to be forged). In other methods, the first die cavity in the first die half may receive just a portion of the preform, and the second die half may include a second die cavity (e.g., second die cavity 20), where the first die cavity and the second die cavity together receive the preform and form the forged part. Such methods 200 may include forming a second die half at 216, which may mirror the forming the first die half at 202. For example, forming the second die half at 216 generally includes cutting a third layer (e.g., third layer 44) of the second die half to form a first portion of the second die cavity (e.g., first portion 48) at 218 and cutting a fourth layer (e.g., fourth layer 46) of the second die half to form a second portion of the second die cavity (e.g., second portion 50) at 220.

Forming the second die half at 216 may also include stacking the third and fourth layers together at 222 such that the first and second portions of the second die cavity are positioned with respect to one another and aligned to form the second die cavity (e.g., thereby forming an assembly or laminate), and fastening the third and fourth layers together at 224 to assemble the second die half. Fastening the third and fourth layers together at 224 may include fastening the layers together (e.g., via second plurality of fasteners 58) and/or otherwise binding them together, such as via an adhesive or other fastening means. In some examples, fastening the third and fourth layers together at 224 may include inserting one or more keyways into the forging die to maintain alignment of the layers of the forging die. Additionally or alternatively, stacking the third and fourth layer together at 222 and/or fastening the third and fourth layers at 224 may include dressing one or more interfaces between layers, to create smooth, continuous layer interfaces and/or die cavities.

Again, some methods 200 include cutting one or more additional layers (e.g., one or more intervening layers 36) at 226. In these examples, each additional layer is cut to form a respective portion of the second die cavity, and the stacking the layers at 222 includes stacking the additional layers between the third layer and the fourth layer such that the cut portions are aligned and the layers are arranged in the appropriate order to form the desired second die cavity. Fastening the layers at 224 may include selectively and removably fastening (e.g., bolting) the layers together such that any respective layer may be removed from the assembled second die half by removing one or more of the fasteners. In such methods, a worn layer may be removed and replaced with a replacement layer for maintenance of the second die half, without needing to replace the entire die half. The cutting the third layer at 218, the cutting the fourth layer at 220, and the cutting any additional layers at 226 generally are performed prior to the fastening the layers together at 224 and prior to the stacking the layers at 222. Cutting the layers at 218, 220, and/or 226 is generally performed via water cutting, though any cutting technique is within the scope of the present disclosure, such as laser cutting, machining, milling, band saw (or any type of saw) cutting, and/or plasma cutting.

In some methods 200, forming the first die half at 202 includes securing a first baseplate (e.g., first baseplate 60) to the first layer or the second layer of the first die half at 228. Additionally or alternatively, forming the second die half at 216 may include securing a second baseplate (e.g., second baseplate 62) to the third layer or the fourth layer of the second die half at 230. Such baseplates may be secured at 228 and/or 230 such that they strengthen the respective die half to which they are secured, though the baseplates generally are not cut to form a portion of the die cavities. In methods 200 including securing one or more baseplates to the forging die at 228 and/or 230, engaging the first die half and the second die half at 204 may include positioning the first die half and the second die half such that the first baseplate and the second baseplate are opposite one another, with the first die cavity and/or the second die cavity positioned therebetween.

Additionally or alternatively, methods 200 may include securing one or more reinforcing elements at 232 and/or 234. For example, methods 200 may include securing a first reinforcing element (e.g., first reinforcing element 74) to the first die half at 232 and/or securing a second reinforcing element (e.g., second reinforcing element 76) to the second die half at 234. In some methods, securing the first reinforcing element at 232 and/or securing the second reinforcing element at 234 may include welding the respective reinforcing element to the respective die half. Securing the first reinforcing element at 232 may include securing the first reinforcing element to the first baseplate of the first die half, and/or securing the first reinforcing element to an outer surface (e.g., first outer surface 78) of the first die half. Similarly, securing the second reinforcing element at 234 may include securing the second reinforcing element to the second baseplate of the second die half, and/or securing the second reinforcing element to an outer surface of the second die half (e.g., upper surface 64). Reinforcing elements may be secured at 232, 234 by welding, fastening, adhering, or any other suitable technique, such that they strengthen the first die half and/or second die half. In some examples, reinforcing elements may be configured to maintain the integrity of the first die half and/or second die half during forging.

Some methods 200 include determining the desired number of layers, thickness of layers, and/or material of layers for the first die half and/or second die half at 236. Such determining at 236 may include analyzing the geometry and/or contours of a given part to be forged in the forging die to determine the number of layers, thickness of layers, and/or material of layers to accommodate loads and stresses during forging of the part. In some examples, different respective layers of each die half may have different respective thicknesses and/or may be formed of different materials from other respective layers of the die half, as described above. Additionally or alternatively, methods 200 may include determining the desired number of fasteners, size of fasteners, and/or placement of fasteners at 238 for the first die half and/or the second die half. Such fasteners may be determined at 238 to apply a sufficient compressive force to hold the respective layers of a respective die half together such that the die half retains its integrity during forging of the part. For example, the number, size, and/or placement of fasteners may be determined at 238 to prevent or resist lateral sliding movement of the layers with respect to one another during forging, and/or to prevent or resist introduction of material from the preform into spaces between adjacent respective layers during forging.

In some methods, forming the first die half at 202 may include encapsulating one or more sensors (e.g., sensor 66) in the first die half at 240 and/or forming one or more heating channels (e.g., heating channel 70) and/or cooling channels (e.g., cooling channel 68) at 242. Similarly, forming the second die half at 216 may include encapsulating one or more sensors in the second die half at 244 and/or forming one or more heating channels and/or cooling channels in the second die half at 246. Additionally or alternatively, forming the first die half at 202 may include forming one or more slots (e.g., slot 72) in the first die half and positioning a strain gauge therein at 248, and/or forming the second die half at 216 may include forming one or more slots in the second die half and positioning a strain gauge therein at 250. Accordingly, some methods 200 may facilitate monitoring strain within one or more layers of the first die half and/or within one or more layers of the second die half during forging. Such monitoring may enable identification of specific respective layers of the first die half and/or second die half that may warrant removal and replacement due to possible wear.

In some methods 200, forming the first die half at 202 includes coating one or more layers of the first die half at 252, and/or forming the second die half at 216 may include coating one or more layers of the second die half at 254. Such coating at 252 and/or 254 may include coating one or more layers with a metallic and/or ceramic coating configured to lubricate and/or prevent wear on the layers of the respective die half. Such coating at 252 and/or 254 may be applied by any coating technique, including but not limited to flame spraying, plasma spraying, forming a metal skin, diffusion bonding and/or brazing. In some specific examples, coating at 252 and/or 254 may include coating one or more layers with a solution of graphite suspended in oil (e.g., Houghton International Thermex Go/Fenella oil F G) or a water-based product that may be free from graphite (e.g., Houghton Thermex WG/Fenella Fluid F G), which may be particularly useful for forging aluminum alloy parts. In some specific examples, coating at 252 and/or 254 may include coating one or more layers with Houghton International Thermex 8191 or a glass coating, such as may be useful for forging titanium, zirconium, and/or nickel alloy parts.

FIG. 14 illustrates methods 300 of making a part using presently disclosed forging dies 12. Methods 300 generally include providing a forging die (e.g., forging die 12) at 302, positioning a preform (e.g., preform 22) within the forging die at 304, and pressing the first die half and the second die half of the forging die together (e.g., first die half 14 and second die half 16) at 306. In some methods 300, providing the forging die at 302 includes forming the first die half at 202 (FIG. 13) and/or forming the second die half at 216 (FIG. 13). Positioning the preform within the forging die at 304 generally includes positioning at least a portion of the preform within a first die cavity of the first die half (e.g., first die cavity 18). In some examples, substantially the entire preform is positioned within the first die cavity. In some examples, a first portion of the preform is positioned within the first die cavity, and a second portion of the preform is positioned within a second die cavity of the second die half (e.g., second die cavity 20) when the first die half and the second die half are engaged with one another. Pressing the first die half and the second die half together at 306 may include loading the forging die into a forging press (e.g., forging press 77) at 308 for pressing the die halves together and forging the part.

Methods 300 may include heating the forging die and/or the preform (e.g., before positioning within the forging die, or while it is positioned within the forging die) at 310, which may include heating the forging die and/or the preform to a minimum temperature of at least 100 degrees C., at least 200 degrees C., at least 300 degrees C., at least 400 degrees C., and/or at least 500 degrees C. After the die halves are pressed together at 306 for a sufficient amount of time and at a sufficient force to shape the preform into the desired forged part, the resulting forged part is removed from the forging die at 312. For example, removing the part at 312 may include removing the forging die from the forging press and/or separating the first die half from the second die half to remove the forged part from the first die cavity and/or the second die cavity. Once the forged part is removed from the forging die, a new preform may be positioned within the forging die at 304, and the forging die may again be pressed at 306 to form another forged part, which again may be removed from the forging die at 312. The sequence may be repeated as many times as desired, to forge as many parts as desired within the disclosed forging die. In some methods 300, the forging die is configured to produce a finished or close-to-finished part. In other methods 300, the forging die may be configured to produce a part having drafts and/or fillets that are intended to be further machined after removal from the forging die, and thus in some examples, removing the part at 312 may include machining the part after removal, to finish the forged part.

Some methods 300 include monitoring the layers of the forging die at 314. For example, monitoring the forging die at 314 may include monitoring and/or measuring strain within the first die half and/or the second die half, such as by measuring and analyzing data from one or more strain gauges positioned to monitor the forging die. Such strain gauges may be embedded in one or more respective layers of the first die half and/or second die half, or may be otherwise positioned with respect to the forging die to monitor it. Additionally or alternatively, monitoring the forging die at 314 may include monitoring a temperature of the part being forged and/or of the forging die, such as via one or more sensors (e.g., sensors 66) that may be encapsulated within the forging die and/or otherwise secured to the forging die and/or otherwise positioned within respect to the forging die to measure data. In some methods, monitoring the forging die at 314 may be performed during forging of the part at 306. Additionally or alternatively, monitoring the forging die at 314 may include inspecting the forging die while not in use (e.g., between successive respective forgings) to identify areas of potential wear or excessive stress beyond a predetermined threshold within the first die half and/or the second die half. Monitoring the forging die at 314 may be performed on one or more individual respective layers of the forging die, and/or on the entire forging die.

In some cases, the monitoring the forging die at 314 may result in identification of one or more respective layers of the first die half and/or one or more respective layers of the second die half that have areas of potential wear or excessive stress. In these instances, the identified respective layers may be removed from the respective die half, and replaced by inserting a replacement layer at 316 in the place of the removed layer. The replacement layer is generally the same size and shape of the removed layer, and is cut to form the same respective portion of the same respective die cavity as was the removed layer. For example, if the first layer of the first die half (forming a first portion of the first die cavity) is removed, then the replacement layer will be cut to form the first portion of the first die cavity. Similarly, if the second layer of the first die half (forming a second portion of the first die half) is removed, then the replacement layer will be cut to form the second portion of the first die half, and inserted into the first die half in the same respective position as the second layer was removed from. Such replacement layers may be formed (e.g., cut) on demand in some methods 300, such that replacement layers are formed once they are needed. Additionally or alternatively, such replacement layers may be formed ahead of time, such that they are pre-cut and ready to be inserted into a respective forging die half when needed. For example, if one or more respective layers of a given forging die are known to experience more stress or potential wear than the other respective layers, then replacement layers for these layers may be prepared before forging to have on hand for convenience.

Methods 300 may include flowing a heating fluid and/or a cooling fluid into the forging press at 318. For example, cooling fluid may be flowed into one or more cooling channels (e.g., cooling channel 68) formed in the first die half and/or into one or more cooling channels formed in the second die half at 318, such as in response to temperature readings during monitoring the forging die at 314. Additionally or alternatively, heating fluid may be flowed into one or more heating channels (e.g., heating channel 70) formed in the first die half and/or into one or more heating channels formed in the second die half at 318, such as in response to temperature readings during monitoring the forging die at 314. Any suitable heating fluid and/or cooling fluid may be used. In one specific example, superheated water may be flowed through heating channels at 318 to heat the preform during forging and/or to heat the forging die. Additionally or alternatively, the forging die may include a gas ring around the forging die, with the gas ring being configured to maintain a temperature of the forging die during forging, and/or the forging die may include one or more heating cartridges positioned in and/or around the forging die and configured to provide heat to the forging die.

Illustrative, non-exclusive examples of inventive subject matter according to the present disclosure are described in the following enumerated paragraphs:

A1. A method of making a forging die for forging a part from a preform, the method comprising:

forming a first die half, wherein the forming the first die half comprises:

cutting a first layer to form a first portion of a first die cavity;

cutting a second layer to form a second portion of the first die cavity;

stacking the first layer and the second layer together such that the first portion of the first die cavity and the second portion of the first die cavity are positioned with respect to one another to form the first die cavity; and fastening the first layer and the second layer together to form the first die half; and engaging the first die half with a second die half such that the first die cavity faces the second die half, wherein the first die half is configured to receive at least a portion of the preform, and wherein the forging die is configured to forge the part from the preform when the first die half and the second die half are pressed together.

A1.1. The method of paragraph A1, wherein the cutting the first layer and the cutting the second layer are performed before the fastening the first layer and the second layer together.

A1.2. The method of paragraph A1 or A1.1, wherein the cutting the first layer and the cutting the second layer are performed before the stacking the first layer and the second layer together.

A1.3. The method of any of paragraphs A1-A1.2, further comprising:
forming the second die half, wherein the forming the second die half comprises:
cutting a third layer to form a first portion of a second die cavity;
cutting a fourth layer to form a second portion of the second die cavity;
stacking the third layer and the fourth layer together such that the first portion of the second die cavity and the second portion of the second die cavity are positioned with respect to one another to form the second die cavity; and
fastening the third layer and the fourth layer together to form the second die half;
wherein the second die half and the first die half are configured to cooperate with one another such that the first die cavity faces the second die cavity and such that the first die cavity and the second die cavity are each configured to receive a respective portion of the preform, and wherein the forging die is configured to forge the part from the preform when the first die half and the second die half are pressed together.

A1.4. The method of paragraph A1.3, wherein the cutting the third layer and the cutting the fourth layer are performed before the fastening the third layer and the fourth layer together.

A1.5. The method of paragraph A1.3 or A1.4, wherein the cutting the third layer and the cutting the fourth layer are performed before the stacking the third layer and the fourth layer together.

A2. The method of any of paragraphs A1-A1.5, wherein the forming the first die half comprises:
cutting one or more additional first die layers to form additional respective portions of the first die cavity;
stacking the additional first die layers between the first layer and the second layer such that the additional respective portions of the first die cavity are positioned with respect to the first portion of the first die cavity and the second portion of the first die cavity, to form the first die cavity; and
fastening the additional first die layers to the first layer and the second layer to form the first die half.

A2.1. The method of paragraph A2, wherein the fastening the additional first die layers comprises bolting the additional first die layers to the first layer and the second layer.

A3. The method of paragraph A2 or A2.1, wherein the cutting the additional first die layers comprises cutting at least one additional first die layer, at least two additional first die layers, at least three additional first die layers, at least four additional first die layers, at least five additional first die layers, at least six additional first die layers, at least seven additional first die layers, at least eight additional first die layers, at least nine additional first die layers, at least ten additional first die layers, at least fifteen additional first die layers, at least twenty additional first die layers, and/or at least twenty-five additional first die layers.

A4. The method of any of paragraphs A1-A3, wherein when the method comprises forming the second die half, the forming the second die half comprises:
cutting one or more additional second die layers to form additional respective portions of the second die cavity;
stacking the additional second die layers between the third layer and the fourth layer such that the additional respective portions of the second die cavity are positioned with respect to the first portion of the second die cavity and the second portion of the second die cavity, to form the second die cavity; and
fastening the additional second die layers to the third layer and the fourth layer to form the second die half.

A4.1 The method of paragraph A4, wherein the fastening the additional second die layers comprises bolting the additional second die layers to the third layer and the fourth layer.

A5. The method of paragraph A4 or A4.1, wherein the cutting the additional second die layers comprises cutting at least one additional second die layer, at least two additional second die layers, at least three additional second die layers, at least four additional second die layers, at least five additional second die layers, at least six additional second die layers, at least seven additional second die layers, at least eight additional second die layers, at least nine additional second die layers, at least ten additional second die layers, at least fifteen additional second die layers, at least twenty additional second die layers, and/or at least twenty-five additional second die layers.

A6. The method of any of paragraphs A1-A5, wherein the forming the first die half further comprises securing a first baseplate to one of the first layer and the second layer.

A7. The method of paragraph A6, wherein the first baseplate is thicker than the first layer and/or the second layer.

A8. The method of paragraph A6 or A7, wherein the first baseplate does not form a portion of the first die cavity.

A8.1. The method of any of paragraphs A6-A8, further comprising removing the first baseplate from the first die half, and securing the first baseplate to a different respective die half.

A8.2. The method of any of paragraphs A6-A8.1, wherein the securing the first baseplate comprises securing and reusing a first baseplate that has been removed from a different respective die half.

A9. The method of any of paragraphs A1-A8.2, wherein when the method comprises forming the second die half, the forming the second die half further comprises securing a second baseplate to one of the third layer and the fourth layer.

A10. The method of paragraph A9, wherein the second baseplate is thicker than the third layer and/or the fourth layer.

A11. The method of paragraph A9 or A10, wherein the second baseplate does not form a portion of the second die cavity.

A11.1. method of any of paragraphs A9-A11, further comprising removing the second baseplate from the second die half, and securing the second baseplate to a different respective die half.

A11.2. The method of any of paragraphs A9-A11.1, wherein the securing the second baseplate comprises securing and reusing a second baseplate that has been removed from a different respective die half.

A12. The method of any of paragraphs A1-A11.2, wherein the fastening the first layer to the second layer comprises bolting the first layer to the second layer.

A12.1. The method of any of paragraphs A1-A11, wherein the fastening the first layer to the second layer comprises inserting or applying a filler material configured to fill any irregular gaps between respective adjacent layers.

A13. The method of any of paragraphs A1-A12.1, wherein the fastening the first layer to the second layer comprises binding the first layer, the second layer, and/or any additional first die layers together using a first plurality of fasteners that extend through at least a portion of each respective layer, thereby forming a first laminate of the first die half.

A13.1. The method of paragraph A13, wherein each of the first plurality of fasteners is spaced apart from the first die cavity.

A14. The method of any of paragraphs A1-A13.1, wherein when the method comprises forming the second die half, the fastening the third layer to the fourth layer comprises bolting the third layer to the fourth layer.

A15. The method of any of paragraphs A1-A14, wherein when the method comprises forming the second die half, the fastening the third layer to the fourth layer comprises binding the third layer, the fourth layer, and/or any additional second die layers together using a second plurality of fasteners that extend through at least a portion of each respective layer, thereby forming a second laminate of the second die half.

A15.1. The method of paragraph A15, wherein each of the second plurality of fasteners is spaced apart from the second die cavity.

A15.2. The method of any of paragraphs A1-A15.1, wherein when the method comprises forming the second die half, the fastening the third layer to the fourth layer comprises inserting or applying a filler material configured to fill any irregular gaps between respective adjacent layers.

A16. The method of any of paragraphs A1-A15.2, further comprising positioning the first die half with respect to the second die half such that the first die cavity faces the second die cavity.

A17. The method of paragraph A16, wherein the positioning the first die half with respect to the second die half comprises positioning the first die half such that a/the first baseplate of the first die half and a/the second baseplate of the second die half are opposite one another, with the first die cavity and the second die cavity positioned therebetween.

A18. The method of any of paragraphs A1-A17, wherein at least one of the first layer, the second layer, a/the third layer, a/the fourth layer, a/the first baseplate, a/the second baseplate, any additional first die layer of the first die half, and/or any additional second die layer of the second die half is formed of a different material or grade of material than at least one other of the first layer, the second layer, the third layer, the fourth layer, the first baseplate, the second baseplate, any additional first die layer of the first die half, and/or any additional second die layer of the second die half.

A19. The method of any of paragraphs A1-A18, wherein the first layer is formed of a different material than the second layer.

A20. The method of any of paragraphs A1-A19, wherein the first layer is formed of a stronger material than the second layer.

A20.1. The method of any of paragraphs A1-A20, wherein at least one respective layer of the first die half comprises strip steel.

A20.2. The method of any of paragraphs A1-A20.1, wherein all respective layers of the first die half comprise strip steel.

A21. The method of any of paragraphs A1-A20.2, wherein a/the third layer is formed of a different material than the fourth layer.

A22. The method of any of paragraphs A1-A21, wherein a/the third layer is formed of a stronger material than the fourth layer.

A22.1. The method of any of paragraphs A1-A22, wherein at least one respective layer of the second die half comprises strip steel.

A22.2. The method of any of paragraphs A1-A22.1, wherein all respective layers of the second die half comprise strip steel.

A23. The method of any of paragraphs A1-A22.2, wherein the first die half and the second die half are configured to cooperate with one another such that the first layer of the first die half faces the a/third layer of the second die half.

A24. The method of any of paragraphs A1-A23, further comprising analyzing the geometry and/or contours of a given part to determine desired layer thicknesses and/or the number of layers for each of the first die half and the second die half to accommodate loads and stresses during forging of the part.

A24.1. The method of any of paragraphs A1-A24, wherein the part is a metallic part.

A25. The method of any of paragraphs A1-A24.1, further comprising encapsulating a sensor in the first die half and/or in the second die half, wherein the sensor is configured to monitor and/or measure data from the first die half and/or the second die half, during forging of the part.

A26. The method of any of paragraphs A1-A25, further comprising forming a cooling channel in the first die half and/or in the second die half, wherein the cooling channel extends through one or more layers of the first die half and/or one or more layers of the second die half, and wherein the cooling channel is configured to deliver a cooling fluid to the first die half and/or the second die half during forging of the part.

A26.1. The method of paragraph A26, further comprising flowing a cooling fluid and/or a cooling gas through the cooling channel to cool the first die half and/or the second die half.

A26.2. The method of paragraph A26 or A26.1, further comprising flowing a protective atmospheric gas and/or a lubricant through the cooling channel.

A27. The method of any of paragraphs A1-A26.2, further comprising forming a heating channel in the first die half and/or in the second die half, wherein the heating channel extends through one or more layers of the first die half and/or one or more layers of the second die half, and wherein the heating channel is configured to deliver a heating element to the first die half and/or the second die half during forging of the part.

A27.1. The method of paragraph A27, further comprising flowing a heating fluid and/or a heating gas through the heating channel to heat the first die half and/or the second die half.

A27.2. The method of paragraph A27 or A27.1, further comprising positioning a heating cartridge within the heating channel, wherein the heating cartridge is configured to provide heat to the first die half and/or the second die half.

A27.3. The method of any of paragraphs A27-A27.2, further comprising flowing a protective atmospheric gas and/or a lubricant through the heating channel.

A28. The method of any of paragraphs A1-A27.3, wherein the cutting the first layer and the cutting the second layer comprise water jet cutting.

A29. The method of any of paragraphs A1-A28, wherein when the method comprises forming the second die half, the cutting the third layer and the cutting the fourth layer comprise water jet cutting.

A30. The method of any of paragraphs A1-A29, further comprising forming a first slot in the first die half and positioning a first strain gauge within the first slot, wherein the first strain gauge is configured to measure and/or monitor strain within one or more layers of the first die half.

A31. The method of paragraph A30, wherein the forming the first slot comprises forming the first slot in the second layer of the first die half.

A32. The method of any of paragraphs A1-A31, further comprising forming a second slot in the second die half and positioning a second strain gauge within the second slot, wherein the second strain gauge is configured to measure and/or monitor strain within one or more layers of the second die half.

A33. The method of paragraph A32, wherein the forming the second slot comprises forming the second slot in the fourth layer of the second die half.

A34. The method of any of paragraphs A1-A33, further comprising calculating a number of fasteners, size of fasteners, and/or placement of fasteners for fastening the layers of the first die half together.

A34.1. The method of paragraph A34, wherein the calculating comprises determining the number, size, and/or placement of fasteners sufficient to prevent introduction of material from the preform into spaces between adjacent respective layers of the first die half during forging of the part.

A34.2. The method of paragraph A34 or A34.1, wherein the calculating comprises determining the number, size, and/or placement of fasteners sufficient to maintain integrity of the first die half during forging of the part.

A35. The method of any of paragraphs A1-A34.2, further comprising calculating a number of fasteners, size of fasteners, and/or placement of fasteners for fastening the layers of the second die half together.

A35.1. The method of paragraph A35, wherein the calculating comprises determining the number, size, and/or placement of fasteners sufficient to prevent introduction of material from the preform into spaces between adjacent respective layers of the second die half during forging of the part.

A35.2. The method of paragraph A35 or A35.1, wherein the calculating comprises determining the number, size, and/or placement of fasteners sufficient to maintain integrity of the second die half during forging of the part.

A36. The method of any of paragraphs A1-A35.2, further comprising incorporating drafts and/or fillets into the first die half and/or the second die half, wherein the drafts and/or fillets are configured to facilitate removal of the part from the first die half and the second die half after forging and/or to facilitate metal flow within the first die cavity and/or the second die cavity during forging.

A36.1. The method of any of paragraphs A1-A36, further comprising dressing one or more interfaces between adjacent respective layers, of the first die half and/or the second die have, to create smooth, continuous layer interfaces and/or die cavities.

A37. The method of any of paragraphs A1-A36.1, wherein the first die half and the second die half are configured to minimize the presence of thin plate sections and small radii.

A38. The method of any of paragraphs A1-A37, further comprising securing a first reinforcing element to a first outer surface of the first die half, wherein the first reinforcing element is configured to strengthen the first die half and/or resist movement of the respective layers of the first die half with respect to one another.

A39. The method of paragraph A38, wherein the first reinforcing element comprises a square bar.

A40. The method of paragraph A38 or A39, wherein the securing the first reinforcing element comprises welding the first reinforcing element to the first die half.

A41. The method of any of paragraphs A38-A40, wherein the first outer surface is formed by the second layer of the first die half.

A42. The method of any of paragraphs A38-A40, wherein the first outer surface is formed by a/the first baseplate of the first die half.

A43. The method of any of paragraphs A1-A42, further comprising securing a second reinforcing element to a second outer surface of the second die half, wherein the second reinforcing element is configured to strengthen the second die half and/or resist movement of the respective layers of the second die half with respect to one another.

A44. The method of paragraph A43, wherein the second reinforcing element comprises a square bar.

A45. The method of paragraph A43 or A44, wherein the securing the second reinforcing element comprises welding the second reinforcing element to the second die half.

A46. The method of any of paragraphs A43-A45, wherein the second outer surface is formed by the fourth layer of the second die half.

A47. The method of any of paragraphs A43-A45, wherein the second outer surface is formed by a/the second baseplate of the second die half.

A48. The method of any of paragraphs A1-A47, further comprising coating one or more layers of the first die half and/or one or more layers of the second die half with a metallic and/or ceramic coating, wherein the coating is configured to lubricate and/or prevent wear on the first die half and/or the second die half.

A49. The method of paragraph A48, wherein the coating one or more layers comprises flame spraying, plasma spraying, forming a metal skin, diffusion bonding and/or brazing.

B1. A forging die for forging a part from a preform, the forging die comprising:
  a first die half, wherein the first die half comprises:
    a first layer cut to form a first portion of a first die cavity;
    a second layer cut to form a second portion of the first die cavity, wherein the first layer and the second layer are configured to be stacked together such that the first portion of the first die cavity and the second portion of the first die cavity are positioned with respect to one another to form the first die cavity; and
    a first plurality of fasteners fastening the first layer and the second layer together to form the first die half; and
  a second die half, wherein the second die half and the first die half are configured to cooperate with one another such that the first die cavity faces the second die half and such that the first die cavity is configured to receive at least a portion of the preform, and wherein the forging die is configured to forge the part from the preform when the first die half and the second die half are pressed together B1.1. The forging die of paragraph B1, wherein the first layer and the second layer are configured to be cut before they are stacked and fastened together.

B2. The forging die of any of paragraphs B1-B1.1, wherein the first die half comprises one or more additional first die layers each cut to form an additional respective portion of the first die cavity, wherein each additional first die layer is configured to be stacked between the first layer and the second layer such that the additional respective portions of the first die cavity are positioned with respect to the first portion of the first die cavity and the second portion of the first die cavity, to form the first die cavity.

B3. The forging die of paragraph B2, wherein the one or more additional first die layers are fastened to the first layer and the second layer to form the first die half.

B4. The forging die of paragraph B2 or B3, wherein the one or more additional first die layers are fastened to the first layer and the second layer via a first plurality of bolts.

B5. The forging die of any of paragraphs B2-B4, wherein the one or more additional first die layers comprises at least one additional first die layer, at least two additional first die layers, at least three additional first die layers, at least four additional first die layers, at least five additional first die layers, at least six additional first die layers, at least seven additional first die layers, at least eight additional first die layers, at least nine additional first die layers, at least ten additional first die layers, at least fifteen additional first die layers, at least twenty additional first die layers, and/or at least twenty-five additional first die layers.

B6. The forging die of any of paragraphs B1-B5, wherein the second die half comprises:
a third layer cut to form a first portion of a second die cavity;
a fourth layer cut to form a second portion of the second die cavity, wherein the third layer and the fourth layer are configured to be stacked together such that the first portion of the second die cavity and the second portion of the second die cavity are positioned with respect to one another to form the second die cavity; and
a second plurality of fasteners fastening the third layer and the fourth layer together to form the second die half;
wherein the second die half and the first die half are configured to cooperate with one another such that the first die cavity faces the second die cavity and such that the first die cavity and the second die cavity are each configured to receive a respective portion of the preform, and wherein the forging die is configured to forge the part from the preform when the first die half and the second die half are pressed together.

B7. The forging die of paragraph B6, wherein the third layer and the fourth layer are configured to be cut before they are stacked and fastened together.

B8. The forging die of any of paragraphs B6-B7, wherein the second die half comprises one or more additional second die layers each cut to form an additional respective portion of the second die cavity, wherein each additional second die layer is configured to be stacked between the third layer and the fourth layer such that the additional respective portions of the second die cavity are positioned with respect to the first portion of the second die cavity and the second portion of the second die cavity, to form the second die cavity.

B8.1. The forging die of paragraph B8, wherein the one or more additional second die layers are fastened to the third layer and the fourth layer to form the second die half.

B9. The forging die of paragraph B8 or B8.1, wherein the one or more additional second die layers are fastened to the third layer and the fourth layer via a second plurality of bolts.

B10. The forging die of any of paragraphs B8-B9, wherein the one or more additional second die layers comprises at least one additional second die layer, at least two additional second die layers, at least three additional second die layers, at least four additional second die layers, at least five additional second die layers, at least six additional second die layers, at least seven additional second die layers, at least eight additional second die layers, at least nine additional second die layers, at least ten additional second die layers, at least fifteen additional second die layers, at least twenty additional second die layers, and/or at least twenty-five additional second die layers.

B11. The forging die of any of paragraphs B1-B10, wherein the first die half comprises a first baseplate secured to one of the first layer and the second layer.

B12. The forging die of paragraph B11, wherein the first baseplate is thicker than the first layer and/or the second layer.

B13. The forging die of paragraph B11 or B12, wherein the first baseplate does not form a portion of the first die cavity.

B13.1. The forging die of any of paragraphs B11-B13, wherein the first baseplate is configured to support the first die half and/or to reduce the number of layer interfaces of the first die half.

B14. The forging die of any of paragraphs B1-B13.1, wherein the second die half comprises a second baseplate secured to one of a/the third layer and a/the fourth layer.

B15. The forging die of paragraph B14, wherein the second baseplate is thicker than the third layer and/or the fourth layer.

B16. The forging die of paragraph B14 or B15, wherein the second baseplate does not form a portion of the second die cavity.

B16.1. The forging die of any of paragraphs B14-B16, wherein the second baseplate is configured to support the second die half and/or to reduce the number of layer interfaces of the second die half.

B17. The forging die of any of paragraphs B1-B16.1, wherein the first plurality of fasteners comprises a first plurality of bolts fastening the first layer and the second layer together to form the first die half.

B18. The forging die of any of paragraphs B1-B17, wherein one or more respective fasteners of the first plurality of fasteners extends through at least a portion of each respective layer of the first die half.

B19. The forging die of any of paragraphs B1-B18, wherein one or more respective fasteners of the first plurality of fasteners extends through at least two respective layers of the first die half.

B20. The forging die of any of paragraphs B1-B19, wherein each respective fastener of the first plurality of fasteners is spaced apart from the first die cavity.

B21. The forging die of any of paragraphs B1-B20, wherein a/the second plurality of fasteners of the second die half comprises a second plurality of bolts fastening a/the third layer and a/the fourth layer together to form the second die half.

B22. The forging die of any of paragraphs B1-B21, wherein one or more respective fasteners of a/the second plurality of fasteners extends through at least a portion of each respective layer of the second die half.

B23. The forging die of any of paragraphs B1-B22, wherein one or more respective fasteners of the second plurality of fasteners extends through at least two respective layers of the second die half.

B24. The forging die of any of paragraphs B1-B23, wherein each respective fastener of the second plurality of fasteners is spaced apart from the second die cavity.

B25. The forging die of any of paragraphs B1-B24, wherein a/the first baseplate of the first die half and a/the second baseplate of the second die half are positioned opposite one another, with the first die cavity and the second die cavity positioned therebetween.

B26. The forging die of any of paragraphs B1-B25, wherein at least one of the first layer, the second layer, a/the third layer, a/the fourth layer, a/the first baseplate, a/the second baseplate, any additional first die layer of the first die half, and/or any additional second die layer of the second die half is formed of a different material or grade of material than at least one other of the first layer, the second layer, the third layer, the fourth layer, the first baseplate, the second baseplate, any additional first die layer of the first die half, and/or any additional second die layer of the second die half.

B27. The forging die of any of paragraphs B1-B26, wherein the first layer is formed of a different material than the second layer.

B28. The forging die of any of paragraphs B1-B27, wherein the first layer is formed of a stronger material than the second layer.

B29. The forging die of any of paragraphs B1-B28, wherein at least one respective layer of the first die half comprises strip steel.

B30. The forging die of any of paragraphs B1-B29, wherein all respective layers of the first die half comprise strip steel.

B31. The forging die of any of paragraphs B1-B30, wherein the a/third layer of the second die half is formed of a different material than a/the fourth layer of the second die half.

B32. The forging die of any of paragraphs B1-B31, wherein a/the third layer of the second die half is formed of a stronger material than a/the fourth layer of the second die half.

B33. The forging die of any of paragraphs B1-B32, wherein at least one respective layer of the second die half comprises strip steel.

B34. The forging die of any of paragraphs B1-B33, wherein all respective layers of the second die half comprise strip steel.

B35. The forging die of any of paragraphs B1-B34, wherein the first die half and the second die half are arranged with respect to one another such that the first layer of the first die half faces a/the third layer of the second die half.

B36. The forging die of any of paragraphs B1-B35, wherein the forging die is configured to have a customizable number of layers, layer thicknesses, and/or layer materials, depending on the geometry and/or contours of the part.

B36.1. The forging die of any of paragraphs B1-B36, wherein the part is a metallic part.

B37. The forging die of any of paragraphs B1-B36.1, further comprising a sensor encapsulated in the first die half and/or in the second die half, wherein the sensor is configured to monitor and/or measure data from the first die half and/or the second die half, during forging of the part.

B38. The forging die of any of paragraphs B1-B37, further comprising a cooling channel in the first die half and/or in the second die half, wherein the cooling channel extends through one or more layers of the first die half and/or one or more layers of the second die half, and wherein the cooling channel is configured to deliver a cooling fluid to the first die half and/or the second die half during forging of the part.

B39. The forging die of any of paragraphs B1-B38, further comprising a heating channel in the first die half and/or in the second die half, wherein the heating channel extends through one or more layers of the first die half and/or one or more layers of the second die half, and wherein the heating channel is configured to deliver a heating element to the first die half and/or the second die half during forging of the part.

B40. The forging die of any of paragraphs B1-B39, wherein each of the first layer, the second layer, a/the third layer, and a/the fourth layer are configured to be water jet cut in order to form the first die cavity and the second die cavity, respectively.

B41. The forging die of any of paragraphs B1-B40, further comprising:
a first slot in the first die half; and
a first strain gauge positioned within the first slot, wherein the first strain gauge is configured to measure and/or monitor strain within one or more layers of the first die half.

B42. The forging die of paragraph B41, wherein the first slot is formed in the second layer of the first die half.

B43. The forging die of any of paragraphs B1-B42, further comprising:
a second slot in the second die half; and
a second strain gauge positioned within the second slot, wherein the second strain gauge is configured to measure and/or monitor strain within one or more layers of the second die half.

B44. The forging die of paragraph B43, wherein the second slot is formed in the fourth layer of the second die half.

B45. The forging die of any of paragraphs B1-B44, wherein the first plurality of fasteners is configured to prevent introduction of material from the preform into spaces between adjacent respective layers of the first die half during forging of the part.

B46. The forging die of any of paragraphs B1-B45, wherein the first plurality of fasteners is configured to maintain integrity of the first die half during forging of the part.

B47. The forging die of any of paragraphs B1-B46, wherein the second plurality of fasteners is configured to prevent introduction of material from the preform into spaces between adjacent respective layers of the second die half during forging of the part.

B48. The forging die of any of paragraphs B1-B47, wherein the second plurality of fasteners is configured to maintain integrity of the second die half during forging of the part.

B49. The forging die of any of paragraphs B1-B48, further comprising drafts and/or fillets incorporated into the first die half and/or the second die half, wherein the drafts and/or fillets are configured to facilitate removal of the part from the first die half and the second die half after forging and/or to facilitate metal flow within the first die cavity and/or the second die cavity during forging.

B50. The forging die of any of paragraphs B1-B49, further comprising a first reinforcing element secured to a first outer surface of the first die half, wherein the first reinforcing element is configured to strengthen the first die half and/or resist movement of the respective layers of the first die half with respect to one another.

B51. The forging die of paragraph B50, wherein the first reinforcing element comprises a first square bar.

B52. The forging die of paragraph B50 or B51, wherein the first reinforcing element is welded to the first die half.

B53. The forging die of any of paragraphs B50-B52, wherein the first outer surface is formed by the second layer of the first die half.

B54. The forging die of any of paragraphs B50-B52, wherein the first outer surface is formed by a/the first baseplate of the first die half.

B55. The forging die of any of paragraphs B1-B54, further comprising a second reinforcing element secured to a second outer surface of the second die half, wherein the second reinforcing element is configured to strengthen the second die half and/or resist movement of the respective layers of the second die half with respect to one another.

B56. The forging die of paragraph B50, wherein the second reinforcing element comprises a second square bar.

B57. The forging die of paragraph B55 or B56, wherein the second reinforcing element is welded to the second die half.

B58. The forging die of any of paragraphs B55-B57, wherein the second outer surface is formed by the fourth layer of the second die half.

B59. The forging die of any of paragraphs B55-B57, wherein the second outer surface is formed by a/the second baseplate of the second die half.

B60. The forging die of any of paragraphs B1-B59, wherein the first plurality of fasteners comprises at least five, at least ten, at least fifteen, at least twenty, at least thirty, at least forty, and/or at least fifty fasteners.

B61. The forging die of any of paragraphs B1-B60, wherein the second plurality of fasteners comprises at least five, at least ten, at least fifteen, at least twenty, at least thirty, at least forty, and/or at least fifty fasteners.

B62. The forging die of any of paragraphs B1-B61, wherein the first layer comprises tool steel and the second layer and any additional layers of the first die half comprise strip steel.

B63. The forging die of any of paragraphs B1-B62, wherein a/the third layer of the second die half comprises tool steel and a/the fourth layer of the second die half and any additional layers of the second die half comprise strip steel.

B64. The forging die of any of paragraphs B1-B63, wherein adjacent respective layers of the first die half contact one another when the first die half is assembled.

B65. The forging die of any of paragraphs B1-B64, wherein adjacent respective layers of the second die half contact one another when the second die half is assembled.

B66. The forging die of any of paragraphs B1-B65, wherein each respective layer of the first die half is selectively removable from the first die half.

B67. The forging die of any of paragraphs B1-B66, wherein each respective layer of the second die half is selectively removable from the second die half.

B68. The forging die of any of paragraphs B1-B67, wherein the forging die is configured such that the first use of the forging die results in deformation of the first layer and a/the third layer of the second die half such that a first perimeter ridge is formed around a first perimeter of the first die cavity and such that a second perimeter ridge is formed around a second perimeter of a/the second die cavity.

B69. The forging die of any of paragraphs B1-B68, wherein the first layer is thicker than the second layer.

B69.1. The forging die of paragraph B69, wherein the first layer is at least twice as thick as the second layer.

B70. The forging die of any of paragraphs B1-B69.1, wherein a/the third layer of the second die half is thicker than a/the fourth layer of the second die half.

B70.1. The forging die of paragraph B70, wherein the third layer is at least twice as thick as the fourth layer.

B71. The forging die of any of paragraphs B1-B70.1, wherein a/the first baseplate is thicker than any other respective layer of the first die half.

B71.1. The forging die of paragraph B71, wherein the first baseplate is at least twice as thick as any other respective layer of the first die half.

B72. The forging die of any of paragraphs B1-B71.1, wherein a/the second baseplate is thicker than any other respective layer of the second die half.

B72.1. The forging die of paragraph B72, wherein the second baseplate is at least twice as thick as any other respective layer of the second die half.

B73. The forging die of any of paragraphs B1-B72, wherein the first layer and a/the third layer of the second die half are 20-40 mm thick, and wherein the second layer and a/the fourth layer of the second die half are 10-20 mm thick.

B74. The forging die of any of paragraphs B1-B73, wherein a/the first baseplate of the first die half and a/the second baseplate of the second die half are 50-90 mm thick.

C1. A method of making a part, the method comprising:
providing a forging die according to any of paragraphs B1-B74;
positioning a preform within the first die cavity and/or a/the second die cavity;
pressing the first die half and the second die half together, thereby forging the preform into the part in the first die cavity and/or the second die cavity.

C2. The method of paragraph C1, wherein the pressing the first die half and the second die half together comprises loading the first die half and the second die half into a forging press and pressing the die halves together using the forging press.

C2.1. The method of paragraph C2, wherein the forging press is a hydraulic press.

C2.2. The method of any of paragraphs C2 or C2.1, wherein the pressing the die halves together using the forging press comprises causing the forging press to have a ram velocity of at least 5 mm/s, and causing the forging press to exert at least 50 MPa of force onto the first die half and the second die half.

C3. The method of any of paragraphs C1-C2.2, further comprising heating the forging die.

C4. The method of any of paragraphs C1-C3, further comprising heating the preform, wherein the heating the preform is performed prior to the positioning the preform within the first die cavity and the second die cavity.

C5. The method of any of paragraphs C1-C4, wherein the preform comprises a metal alloy.

C6. The method of any of paragraphs C1-05, further comprising removing the part from the forging die after the pressing the first die half and the second die half together sufficiently to cause the preform to be formed into the part.

C7. The method of paragraph C6, further comprising repeating each of the positioning the preform, the pressing the first die half and the second die half together, and the removing the part from the forging die a plurality of times, thereby forming a plurality of parts in the forging die.

C8. The method of any of paragraphs C1-C7, wherein the providing the forging die comprises performing the method of any of paragraphs A1-A49.

C9. The method of any of paragraphs C1-C8, further comprising positioning the forging die in a furnace configured to heat the forging die to a minimum temperature of at least 100 degrees C., at least 200 degrees C., at least 300 degrees C., at least 400 degrees C., and/or at least 500 degrees C.

C10. The method of any of paragraphs C1-C9, further comprising monitoring and/or measuring strain within the first die half during forging of the part, using a/the first strain gauge embedded within the first die half.

C11. The method of any of paragraphs C1-C10, further comprising monitoring and/or measuring strain within the second die half during forging of the part, using a/the second strain gauge embedded within the second die half.

C12. The method of any of paragraphs C1-C11, further comprising flowing cooling fluid into a/the first cooling channel formed in the first die half and/or into a/the second cooling channel formed in the second die half.

C13. The method of any of paragraphs C1-C12, further comprising flowing heating fluid into a/the first heating channel formed in the first die half and/or into a/the second heating channel formed in the second die half.

C13.1. The method of paragraph C13, wherein the heating fluid comprises superheated water.

C14. The method of any of paragraphs C1-C13.1, further comprising inspecting and/or monitoring one or more respective layers of the first die half and/or one or more respective layers of the second die half.

C15. The method of paragraph C14, wherein the inspecting and/or monitoring is performed between successive forgings performed by the forging die.

C16. The method of paragraph C14 or C15, wherein the inspecting and/or monitoring is performed during the forging of the part.

C17. The method of any of paragraphs C14-C16, wherein the inspecting and/or monitoring comprises detecting and/or identifying areas of wear or excessive stress beyond a predetermined threshold within the first die half and/or the second die half.

C18. The method of paragraph C17, wherein the detecting and/or identifying comprises identifying a respective layer of the first die half and/or second die half that may be worn or exposed to excessive stress.

C19. The method of any of paragraphs C1-C18, further comprising removing one or more respective layers from the first die half.

C19.1. The method of paragraph C19, further comprising positioning one or more new respective layers into the first die half, to replace removed layers.

C20. The method of any of paragraphs C1-C19.1, further comprising removing one or more respective layers from the second die half.

C20.1. The method of paragraph C20, further comprising positioning one or more new respective layers into the second die half, to replace removed layers.

C21. The method of any of paragraphs C1-C20.1, further comprising:
  identifying an area of wear within one or more respective layers of the first die half and/or second die half;
  removing the respective layer or layers having the area of wear from the forging die; and
  inserting a replacement layer into the forging die, wherein the replacement layer is cut to correspond to the respective layer removed from the forging die.

D1. A part made according to the method of any of paragraphs C1-C21.

D2. The part of paragraph D1, wherein the part is comprises of a metal alloy.

D3. A part made using the forging die of any of paragraphs B1-B74.

D4. A part according to any of paragraphs D1-D3, wherein the part is a part for an aircraft.

E1. Use of the forging die of any of paragraphs B1-B74 to forge a metallic part.

E2. Use of the forging die of any of paragraphs B1-B74 to forge a part for an aircraft.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of making a forging die for forging a part, the method comprising:
  forming a first die half, wherein forming the first die half comprises:

cutting a first layer to form a first portion of a first die cavity;
cutting a second layer to form a second portion of the first die cavity;
stacking the first layer and the second layer together such that the first portion of the first die cavity and the second portion of the first die cavity are positioned with respect to one another to form the first die cavity; and
fastening the first layer and the second layer together to form the first die half, wherein the fastening the first layer and the second layer together comprises:
binding the first layer and the second layer together using a first plurality of fasteners that extend through at least a portion of each of the first layer and the second layer, thereby forming the first die half; and
calculating a first number, size, and/or placement of the first plurality of fasteners sufficient to prevent introduction of material from a preform into spaces between adjacent respective layers of the first die half during forging of the part; and
engaging the first die half with a second die half such that the first die cavity faces the second die half, wherein the first die cavity is configured to receive at least a portion of the preform, and wherein the forging die is configured to forge the part from the preform when the first die half and the second die half are pressed together.

2. The method according to claim 1, further comprising:
forming a second die half, wherein forming the second die half comprises:
cutting a third layer to form a first portion of a second die cavity;
cutting a fourth layer to form a second portion of the second die cavity;
stacking the third layer and the fourth layer together such that the first portion of the second die cavity and the second portion of the second die cavity are positioned with respect to one another to form the second die cavity; and
fastening the third layer and the fourth layer together to form the second die half;
wherein the second die half and the first die half are configured to cooperate with one another such that the first die cavity faces the second die cavity and such that the first die cavity and the second die cavity are each configured to receive a respective portion of the preform, and wherein forging die is configured to forge the part from the preform when the first die half and the second die half are pressed together.

3. The method according to claim 2, wherein cutting the first layer and cutting the second layer are performed before fastening the first layer and the second layer together, and wherein cutting the third layer and cutting the fourth layer are performed before fastening the third layer and the fourth layer together.

4. The method according to claim 2, wherein forming the first die half comprises:
cutting a plurality of additional first die layers to form additional respective portions of the first die cavity;
stacking the additional first die layers between the first layer and the second layer such that the additional respective portions of the first die cavity are positioned with respect to the first portion of the first die cavity and the second portion of the first die cavity, to form the first die cavity; and
fastening the additional first die layers to the first layer and the second layer to form the first die half; and
wherein forming the second die half comprises:
cutting a plurality of additional second die layers to form additional respective portions of the second die cavity;
stacking the additional second die layers between the third layer and the fourth layer such that the additional respective portions of the second die cavity are positioned with respect to the first portion of the second die cavity and the second portion of the second die cavity, to form the second die cavity; and
fastening the additional second die layers to the third layer and the fourth layer to form the second die half.

5. The method according to claim 4, wherein forming the first die half further comprises securing a first baseplate to the second layer, wherein the first baseplate is thicker than the first layer and the second layer, wherein the first baseplate does not form a portion of the first die cavity, wherein forming the second die half further comprises securing a second baseplate to the fourth layer, wherein the second baseplate is thicker than the third layer and the fourth layer, wherein the second baseplate does not form a portion of the second die cavity, and wherein the method further comprises positioning the first die half with respect to the second die half such that the first die cavity faces the second die cavity and such that the first baseplate of the first die half and the second baseplate of the second die half are opposite one another, with the first die cavity and the second die cavity positioned therebetween.

6. The method according to claim 5, wherein fastening the first layer to the second layer comprises binding the first layer, the second layer, the additional first die layers, and the first baseplate together using the first plurality of fasteners, wherein the first plurality of fasteners extend through at least a portion of each respective layer, thereby forming the first die half, and wherein fastening the third layer to the fourth layer comprises binding the third layer, the fourth layer, the additional second die layers, and the second baseplate together using a second plurality of fasteners that extend through at least a portion of each respective layer, thereby forming the second die half.

7. The method according to claim 6, further comprising:
calculating a second number, size, and/or placement of the second plurality of fasteners sufficient to prevent introduction of material from the preform into spaces between adjacent respective layers of the second die half during forging of the part.

8. The method according to claim 4, wherein the forming the first die half comprises varying thicknesses of one or more selected from the group consisting of the first layer, the second layer, and the additional first die layers, such that at least one respective layer of the first die half has a different thickness from at least one other respective layer of the first die half.

9. The method according to claim 2, further comprising analyzing the geometry and/or contours of the part to determine desired layer thicknesses and the number of layers for each of the first die half and the second die half to accommodate loads and stresses during forging of the part.

10. The method according to claim 2, further comprising:
positioning at least the portion of the preform within the first die cavity; and
pressing the first die half and the second die half together, thereby forging the preform.

11. The method according to claim 10, wherein the pressing results in deformation of the first layer and the third layer of the second die half such that a first perimeter ridge is formed around a first perimeter of the first die cavity and such that a second perimeter ridge is formed around a second perimeter of the second die cavity.

12. The method according to claim 11, wherein the first perimeter ridge is formed in a first engagement surface of the first die half such that the first perimeter ridge is raised with respect to the first engagement surface, wherein the second perimeter ridge is formed in a second engagement surface of the second die half such that the second perimeter ridge is raised with respect to the second engagement surface, and wherein pressing the first die half and the second die half together comprises contacting the first engagement surface and the second engagement surface.

13. The method according to claim 1, further comprising encapsulating a sensor in one or more of the first die half and the second die half, wherein the sensor is configured to monitor and measure data from one or more of the first die half and the second die half, during forging of the part.

14. The method according to claim 1, further comprising:
identifying an area of wear within one or more respective layers of the first die half and/or the second die half;
removing the respective layer or layers having the area of wear from the forging die; and
inserting a replacement layer into the forging die, wherein the replacement layer is cut to correspond to the respective layer removed from the forging die.

15. The method according to claim 1, wherein the first layer is formed of a different material than the second layer.

16. The method according to claim 1, wherein at least one respective layer of the first die half comprises strip steel.

17. The method according to claim 1, further comprising analyzing geometry and contours of a given part to determine desired layer thicknesses and a number of layers for each of the first die half and the second die half to accommodate loads and stresses during forging of the part.

18. The method according to claim 1, further comprising coating one or more layers of the first die half with a ceramic coating, wherein the ceramic coating is configured to lubricate and limit wear on the first die half.

19. The method according to claim 1, further comprising dressing one or more interfaces between adjacent respective layers of the first die half to create smooth, continuous layer interfaces and thereby a smooth first die cavity.

20. The method according to claim 1, further comprising:
forming a first slot in the first die half; and
positioning a first strain gauge within the first slot, wherein the first strain gauge is configured to measure and monitor strain within one or more layers of the first die half.

* * * * *

UNITED STATES PATENT AND TRADEMARK OFFICE
CERTIFICATE OF CORRECTION

PATENT NO. : 10,940,523 B2
APPLICATION NO. : 15/996343
DATED : March 9, 2021
INVENTOR(S) : David P. Heck, Kevin Thomas Slattery and David M. Milliken Page 1 of 1

It is certified that error appears in the above-identified patent and that said Letters Patent is hereby corrected as shown below:

In the Claims

Claim 2, Column 35, Line 49, insert --the-- before "forging die"

Signed and Sealed this
Eleventh Day of October, 2022

Katherine Kelly Vidal
*Director of the United States Patent and Trademark Office*